United States Patent
Zhang et al.

(10) Patent No.: US 12,445,643 B2
(45) Date of Patent: Oct. 14, 2025

(54) HISTORY-BASED MOTION VECTOR PREDICTION WITH DEFAULT PARAMETERS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/772,861

(22) Filed: Jul. 15, 2024

(65) Prior Publication Data
US 2024/0373061 A1    Nov. 7, 2024

Related U.S. Application Data

(63) Continuation of application No. 17/539,004, filed on Nov. 30, 2021, now Pat. No. 12,041,268, which is a
(Continued)

(30) Foreign Application Priority Data

Jun. 8, 2019   (WO) ................ PCT/CN2019/090451
Jul. 4, 2019   (WO) ................ PCT/CN2019/094703

(51) Int. Cl.
*H04N 19/58*       (2014.01)
*H04N 19/513*      (2014.01)
(Continued)

(52) U.S. Cl.
CPC ............ *H04N 19/58* (2014.11); *H04N 19/52* (2014.11); *H04N 19/521* (2014.11); *H04N 19/577* (2014.11); *H04N 19/96* (2014.11)

(58) Field of Classification Search
None
See application file for complete search history.

(56) References Cited

U.S. PATENT DOCUMENTS

| | | |
|---|---|---|
| 6,249,550 B1 | 6/2001 | Mizuno |
| 12,041,268 B2 | 7/2024 | Zhang |
| (Continued) | | |

FOREIGN PATENT DOCUMENTS

| | | |
|---|---|---|
| CN | 1642284 A | 7/2005 |
| CN | 107113424 A | 8/2017 |
| (Continued) | | |

OTHER PUBLICATIONS

Zhang et al. "CE4-Related: History-based Motion Vector Prediction," Joint Video Experts Team (JVET) of ITU-T SG 16 WP 3 and ISO/IEC JTC 1/SC 29/WG 1111th Meeting: Ljubljana, SI, Jul. 10-18, 2018, document JVET-K0104, 2018. (Year: 2018).*
(Continued)

*Primary Examiner* — Kaitlin A Retallick
(74) *Attorney, Agent, or Firm* — Conley Rose, P.C.

(57) ABSTRACT

Video coding and decoding techniques, including history-based motion vector prediction with default parameters, are described. One example video processing method includes resetting, for a conversion between a video unit of a video and a bitstream of the video, a history-based motion vector prediction (HMVP) table of size N by adding K HMVP motion candidates to the HMVP table, where the K HMVP motion candidates have default values, where N and K are positive integers, and where K≤N; and performing the
(Continued)

conversion between the video unit and the bitstream using the HMVP table resulting from the resetting.

20 Claims, 29 Drawing Sheets

Related U.S. Application Data continuation of application No. PCT/CN2020/094842, filed on Jun. 8, 2020.

(51) Int. Cl.
  *H04N 19/52* (2014.01)
  *H04N 19/577* (2014.01)
  *H04N 19/96* (2014.01)

(56) References Cited

U.S. PATENT DOCUMENTS

| | | | |
|---|---|---|---|
| 2004/0047418 A1 | 3/2004 | Tourapis | |
| 2012/0162452 A1 | 6/2012 | Liu | |
| 2013/0342636 A1 | 12/2013 | Tian | |
| 2018/0324437 A1 | 11/2018 | Kim | |
| 2020/0021839 A1* | 1/2020 | Pham Van | H04N 19/15 |
| 2020/0107017 A1* | 4/2020 | Hung | H04N 19/132 |
| 2020/0169745 A1* | 5/2020 | Han | H04N 19/513 |
| 2021/0006787 A1 | 1/2021 | Zhang et al. | |
| 2021/0037240 A1 | 2/2021 | Zhang et al. | |
| 2021/0037256 A1 | 2/2021 | Zhang et al. | |
| 2021/0160532 A1 | 5/2021 | Zhang et al. | |
| 2021/0203922 A1* | 7/2021 | Zhang | H04N 19/503 |
| 2021/0211654 A1 | 7/2021 | Zhang et al. | |
| 2021/0218980 A1 | 7/2021 | Zhang et al. | |
| 2021/0266577 A1 | 8/2021 | Zhang et al. | |
| 2021/0266584 A1 | 8/2021 | Zhang et al. | |
| 2021/0266591 A1 | 8/2021 | Zhang et al. | |
| 2021/0274167 A1 | 9/2021 | Liu et al. | |
| 2021/0281847 A1 | 9/2021 | Zhang et al. | |
| 2021/0306657 A1* | 9/2021 | Chen | H04N 19/105 |
| 2021/0352309 A1 | 11/2021 | Liu et al. | |
| 2021/0352315 A1 | 11/2021 | Zhang et al. | |
| 2021/0385451 A1 | 12/2021 | Zhang et al. | |
| 2022/0007047 A1 | 1/2022 | Zhang et al. | |
| 2022/0014734 A1 | 1/2022 | Liu et al. | |
| 2022/0014782 A1 | 1/2022 | Chon et al. | |

FOREIGN PATENT DOCUMENTS

| | | |
|---|---|---|
| CN | 107113446 A | 8/2017 |
| CN | 109417625 A | 3/2019 |
| EP | 1515543 A2 | 3/2005 |
| WO | 2010122301 A1 | 10/2010 |
| WO | 2012102927 A1 | 8/2012 |
| WO | 2013056656 A1 | 4/2013 |
| WO | 2013077659 A1 | 5/2013 |
| WO | 2016034058 A1 | 3/2016 |

OTHER PUBLICATIONS

Document: JVET-N0843-v1, Xiaozhong Xu et al, CE8-related: Combination test of JVET-N0176/JVET-N0317/JVET-N0382 on simplification of IBC vector prediction, Joint Video Experts Team (JVET) of ITU-T SG 16 WP 3 and ISO/IEC JTC 1/SC 29/WG 11, 14th Meeting: Geneva, CH, Mar. 19-27, 2019, 11 pages.
Document: JVET-N0340_r1, Xianglin Wang et al, CE4-related: An improved method for triangle merge list construction, Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.
Document: JVET-L0054, Seungsoo Jeong et al, CE4 Ultimate motion vector expression (Test 4.5.4), Joint Video Experts Team (JVET) of ITU-T SG 16 WP 3 and ISO/IEC JTC 1/SC 29/WG 11, 12th Meeting: Macao, CN, Oct. 3-12, 2018, 6 pages.
Document: JVET-L0100-v3, Man-Shu Chiang et al, CE10.1.1: Multi-hypothesis prediction for improving AMVP mode, skip or merge mode, and intra mode, Joint Video Experts Team (JVET) of ITU-T SG 16 WP 3 and ISO/IEC JTC 1/SC 29/WG 11, 12th Meeting: Macao, CN, Oct. 3-12, 2018.
Document: JVET-M0147-v7, Sriram Sethuraman, CE9: Results of DMVR related Tests CE9.2.1 and CE9.2.2, Joint Video Experts Team (JVET) of ITU-T SG 16 WP 3 and ISO/IEC JTC 1/SC 29/WG 11, 13th Meeting: Marrakech, MA, Jan. 9-18, 2019, 12 pages.
ITU-T H.265, Series H: Audiovisual and Multimedia Systems, Infrastructure of audiovisual services—Coding of moving video, High efficiency video coding, Feb. 2018, 692 pages.
Document: JCTVC-Y1002, C. Rosewarne et al, High Efficiency Video Coding (HEVC) Test Model 16 (HM 16) Improved Encoder Description Update 7, Joint Collaborative Team on Video Coding (JCT-VC) of ITU-T SG16 WP3 and ISO/IEC JTC1/SC29/WG11, 25th Meeting: Chengdu, CN, Oct. 14-21, 2016, 70 pages.
Document: JVET-G1001-v1, Jianle Chen et al, Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, Jul. 13- 21, 2017, 50 pages.
JEM-7.0: https://jvet.hhi.fraunhofer.de/svn/svn_HMJEMSoftware/tags/ HM-16.6-JEM-7.0, Retrieved Jul. 12, 2024, 1 page.
Document: JVET-N0309-v3, Anastasia Henkel et al, Non-CE4: Switched half-pel interpolation filter, Joint Video Experts Team (JVET) of ITU-T SG 16 WP 3 and ISO/IEC JTC 1/SC 29/WG 11, 14th Meeting: Geneva, CH, Mar. 19-27, 2019, 8 pages.
Document: JVET-L0106, Yi-Wen Chen et al, CE4-related: Modified History-based MVP to support parallel processing, Joint Video Experts Team (JVET) of ITU-T SG 16 WP 3 and ISO/IEC JTC 1/SC 29/WG 11, 12th Meeting: Macao, CN, Oct. 3-12, 2018, 3 pages.
Document: JVET-K0104-v1v5, Li Zhang et al, CE4-related: History-based Motion Vector Prediction, Joint Video Experts Team (JVET) of ITU-T SG 16 WP 3 and ISO/IEC JTC 1/SC 29/WG 11, 11th Meeting: Ljubljana, SI, Jul. 10-18, 2018, 7 pages.
Document: JVET-L0266-v1, Li Zhang et al, CE4: History-based Motion Vector Prediction (Test 4.4.7), Joint Video Experts Team (JVET) of ITU-T SG 16 WP 3 and ISO/IEC JTC 1/SC 29/WG 11, 12th Meeting: Macao, CN, Oct. 3-12, 2018, 4 pages.
Office Action from Chinese Patent Application No. 202080042280.6 mailed Apr. 23, 2024 (19 pages).
International Search Report and Written Opinion from International Patent Application No. PCT/CN2020/099681 dated Sep. 28, 2020 (10 pages).
International Search Report and Written Opinion from International Patent Application No. PCT/CN2020/094842 dated Sep. 16, 2020 (9 pages).
Non Final Office Action from U.S. Appl. No. 17/539,004 dated Oct. 25, 2023 (24 pages).
Chen J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, Document: JVET-G1001, 51 Pages.
Henkel, Anastasia et al., "Non-CE4: Switched half-pel interpolation filter", Joint Video Experts Team (JVET) of ITU-T SG 16 WP 3 and ISO/IEC JTC 1/SC 29/WG 11 14th Meeting: Geneva, CH, Mar. 19-27, 2019, (Mar. 27, 2019), JVET-N0309, doi:20200619050701A.
Zhang L., et al., "CE4: History-Based Motion Vector Prediction (Test 4.4.7)," Joint Video Experts Team (JVET) of ITU-T SG 16 WP 3 and ISO/IEC JTC 1/SC 29/WG 11, 12th Meeting: Macao, CN, Oct. 3, 2018-Oct. 12, 2018, Document: JVET-L0266-v2, 8 pages.

* cited by examiner

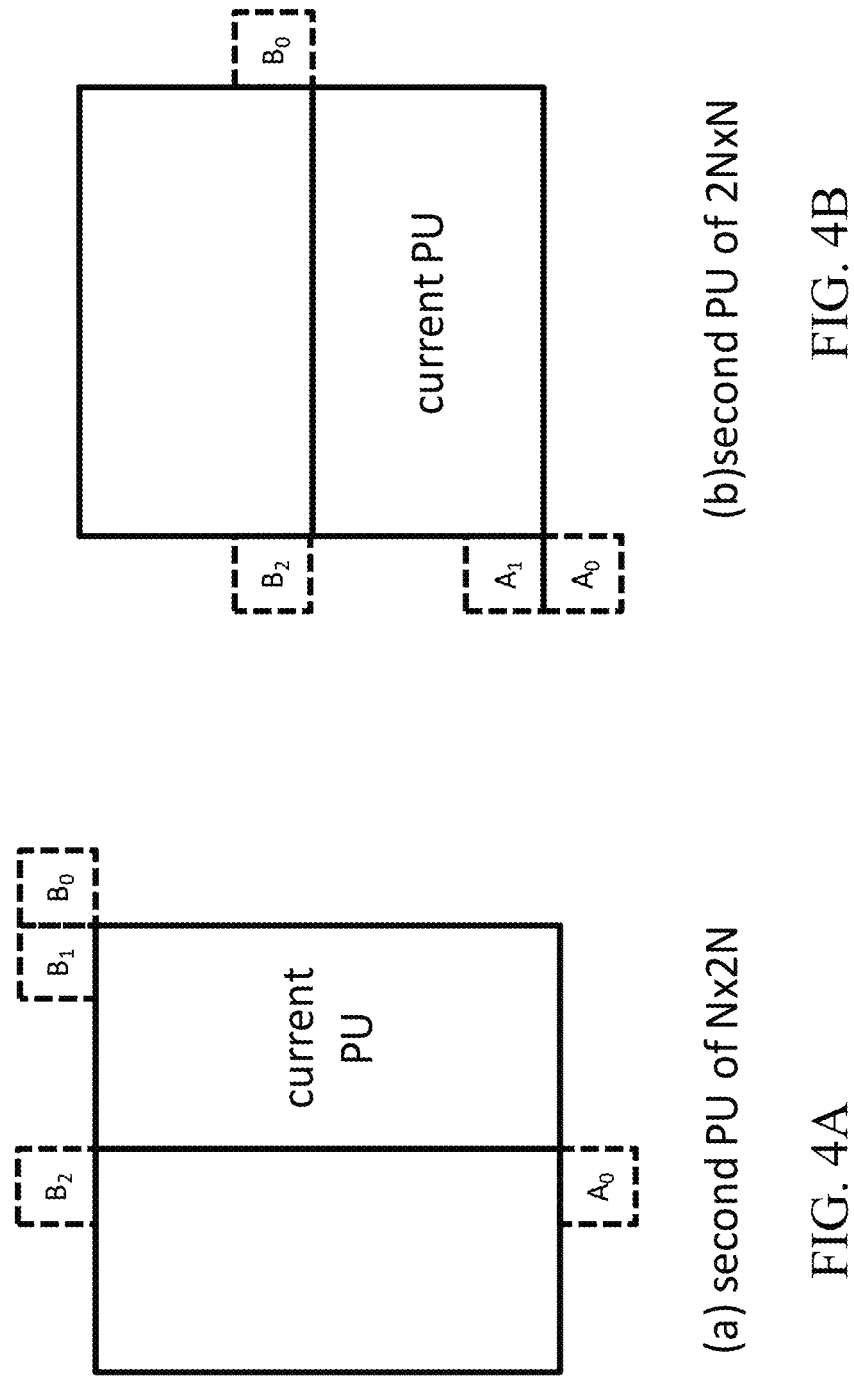
FIG. 4A (a) second PU of Nx2N
FIG. 4B (b) second PU of 2NxN

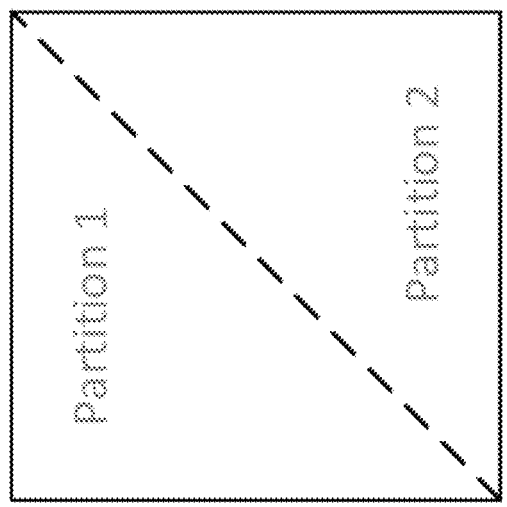
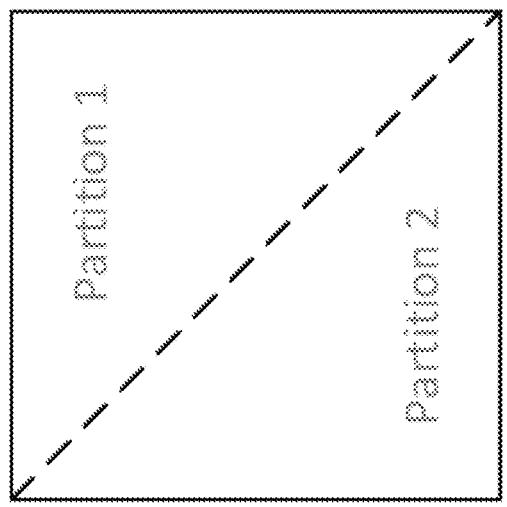
FIG. 14

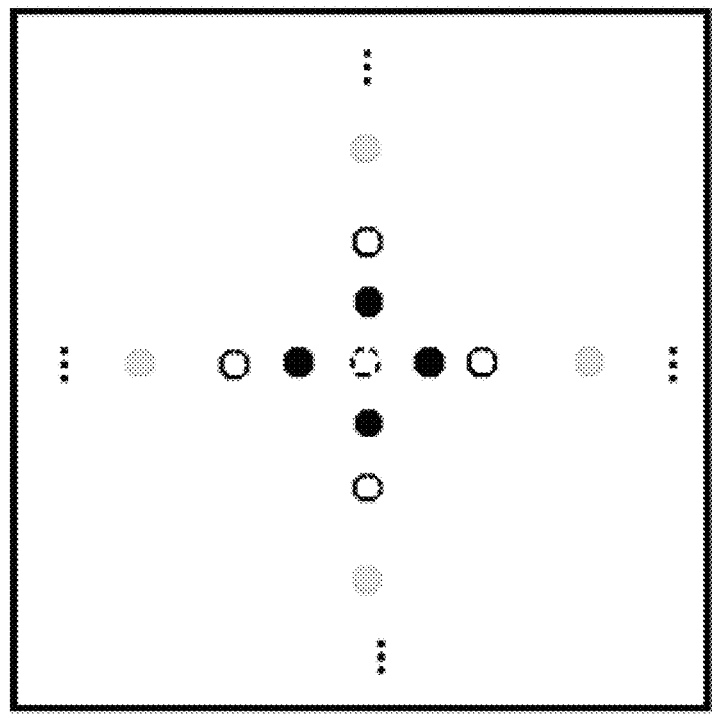
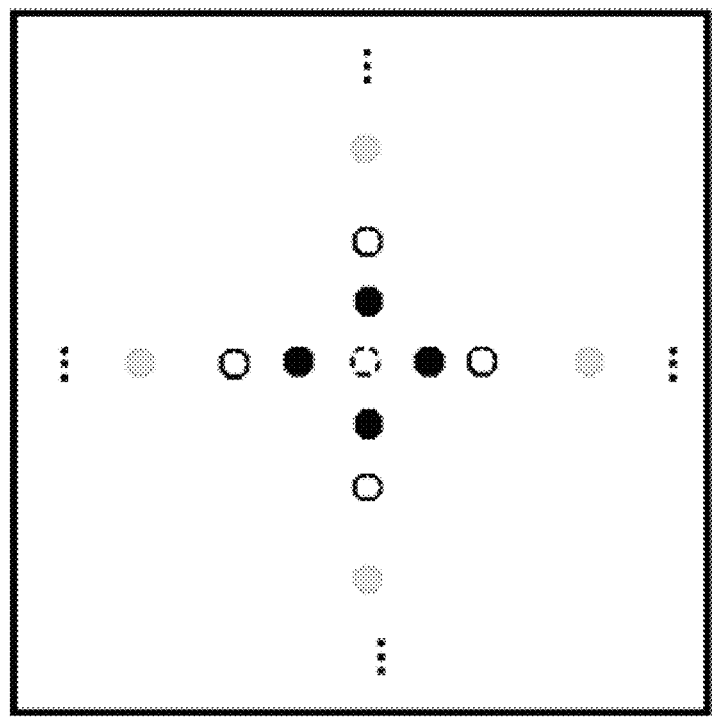
FIG. 18

VTM-5.0

| amvr mode | bin string | ctx | |
|---|---|---|---|
| 0 (QPEL) | 0 | 0 | 1 |
| 1 (FPEL) | 10 | 0,1,2 | 3 |
| 2 (4PEL) | 11 | 0,1,2 | 3 |

Proposed

| amvr mode | bin string | ctx | | |
|---|---|---|---|---|
| 0 (QPEL) | 0 | 0 | 1 | 2 |
| 1 (HPEL) | 10 | 0,1,2 | | |
| 2 (FPEL) | 110 | 0,1,2 | 3 | 4 |
| 3 (4PEL) | 111 | 0,1,2 | 3 | 4 |

FIG. 24

HISTORY-BASED MOTION VECTOR PREDICTION WITH DEFAULT PARAMETERS

CROSS-REFERENCE TO RELATED APPLICATIONS

This application is a continuation application of U.S. patent application Ser. No. 17/539,004, filed on Nov. 30, 2021, which is a continuation of International Application No. PCT/CN2020/094842, filed on Jun. 8, 2020, which claims the priority to and benefits of International Patent Application No. PCT/CN2019/090451, filed on Jun. 8, 2019, and International Patent Application No. PCT/CN2019/094703, filed on Jul. 4, 2019. All the aforementioned patent applications are hereby incorporated by reference in their entireties.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present disclosure describes various embodiments and techniques in which video coding or decoding is performed using history-based motion vector prediction (HMVP) with default parameters.

In one example aspect, a method of video processing is disclosed. The method includes resetting, for a conversion between a video unit of a video and a bitstream representation of the video, a history-based motion vector prediction (HMVP) table of size N by adding K HMVP motion candidates to the HMVP table, wherein the K HMVP motion candidates have default values, wherein N and K are positive integers, and wherein K≤N; and performing the conversion between the video unit and the bitstream representation using the HMVP table resulting from the resetting.

In another example aspect, a method of video processing is disclosed. The method includes adding, to a history-based motion vector prediction (HMVP) table for a video unit, HMVP motion candidates from a first set of K default HMVP motion candidates, wherein the first set of K HMVP motion candidates for the video unit is adaptively changed from a second set of K HMVP motion candidates included in the HMVP table for a second video unit of the video, wherein the second video unit is different from the video unit, wherein the first set of K HMVP motion candidates and the second set of K HMVP motion candidates have default values, wherein the HMVP table has a size of N, wherein N and K are positive integers, and wherein K≤N; and performing a conversion between the video unit of the video and a bitstream representation of the video, wherein the bitstream representation includes syntax elements indicative of the first set of K HMVP motion candidates added to a HMVP table.

In yet another example aspect, a method of video processing is disclosed. The method includes using, upon determining that a history-based motion vector prediction (HMVP) table of size N is reset, a set of K default HMVP candidates to fill the HMVP table, wherein N and K are positive integers, and wherein K≤N; and performing, based on the HMVP table, a conversion between a current block and a bitstream representation of the current block.

In yet another example aspect, another method of video processing is disclosed. The method includes determining, for a conversion between a current block and a bitstream representation of the current block, a set of default HMVP candidates to use during the conversion; and performing the conversion using the set of default HMVP candidates, wherein different HMVP candidates are used during conversion of different video units.

In yet another example aspect, another method of video processing is disclosed. The method includes determining, prior to a conversion between a current block and a bitstream representation of the current block, that a set of N default history-based motion vector prediction (HMVP) candidates have been filled in an HMVP table; adding a motion candidate to the HMVP table; and performing, using the HMVP table comprising the motion candidate, the conversion.

In another example aspect, another method of video processing is disclosed. The method includes storing, prior to a conversion between a current video block and a bitstream representation of the current video block, information for an interpolation filter used for the current video block or side information about a switchable interpolation filter used for the current video block, along with past motion information for the current video block in a table; performing the conversion based on entries of the table; and updating the table after the conversion is performed.

In yet another example aspect, a video processing apparatus is disclosed. The apparatus includes a processor configured to perform an-above disclosed method. The apparatus may further perform video encoding or video decoding.

In yet another example aspect, a computer readable medium is disclosed. The medium has code for processor-implementation of the above-described methods stored on it.

These, and other, aspects are described in the present disclosure.

BRIEF DESCRIPTION OF THE DRAWINGS

FIGS. 4A-4B show example positions for the second prediction unit (PU) of N×2N and 2N×N partitions.

FIG. 14 shows an example of triangle partition based inter prediction.

FIG. 18 shows examples of UMVE search points.

FIG. 24 shows tables for extending signaling of adaptive motion vector difference resolution (AMVR).

DETAILED DESCRIPTION

Figure 1:
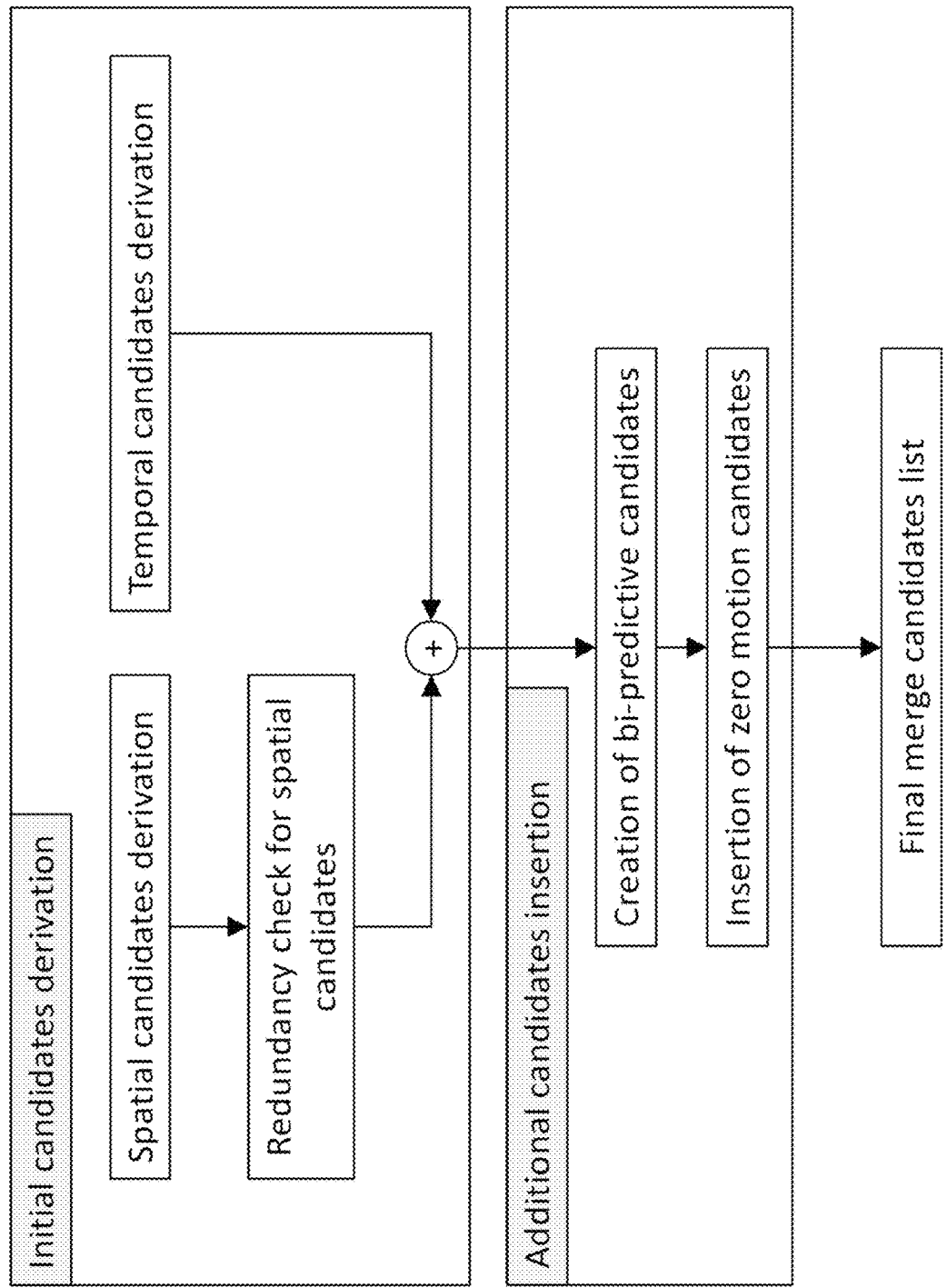
FIG. 1 shows an example derivation process for merge candidates list construction.

Section headings are used in the present disclosure to facilitate ease of understanding and do not limit the embodiments disclosed in a section to only that section. Furthermore, while certain embodiments are described with reference to Versatile Video Coding (VVC) or other specific video codecs, the disclosed embodiments are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

The present disclosure is related to video coding technologies. Specifically, it is related to symmetric motion vector difference coding. It may be applied to the existing video coding standard like High Efficiency Video Coding (HEVC), or the standard (e.g., VVC) to be finalized. It may be also applicable to future video coding standards or video codec.

2. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

2.1 Inter prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices 0.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode
2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 depicts an example of a derivation process for merge candidates list construction.

2.1.2.2 Spatial Candidates Derivation

Figure 3:
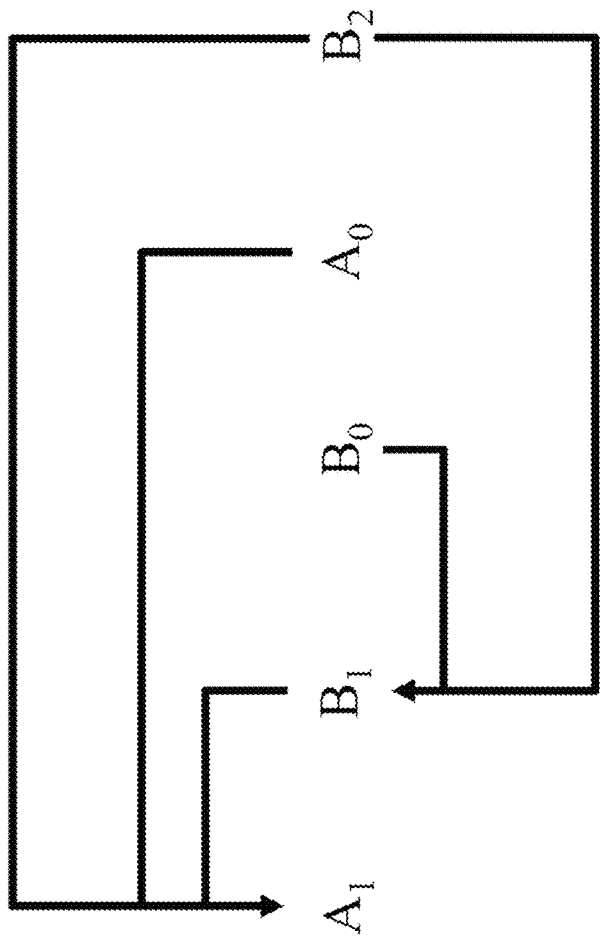
FIG. 3 shows examples of candidate pairs considered for redundancy check of spatial merge candidates.
Figure 2:
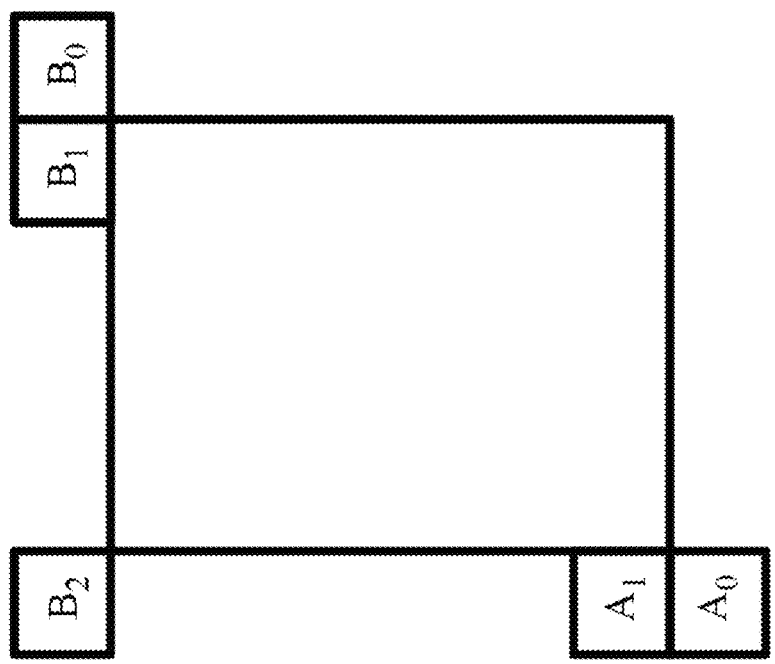
FIG. 2 shows examples of positions of spatial merge candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A-4B depict the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
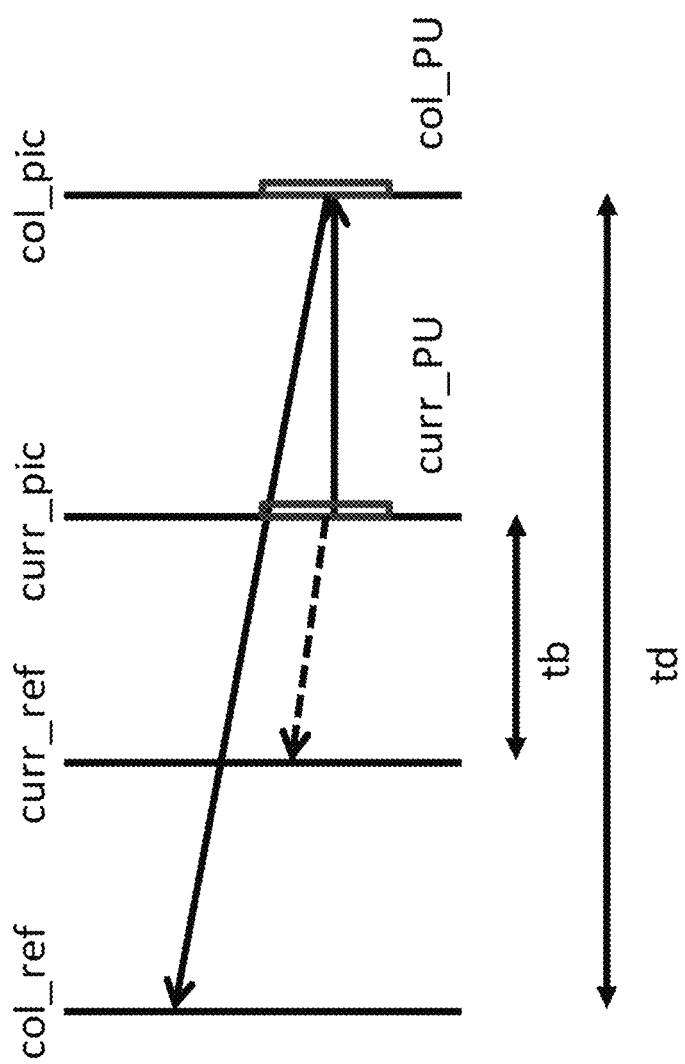
FIG. 5 shows an example of motion vector scaling for temporal merge candidate.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signalled in the slice header. The scaled motion vector for temporal merge candidate is obtained as illustrated by the dotted line in FIG. 5 which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

2.1.2.4 Co-Located Picture and Co-Located PU

When TMVP is enabled (i.e., slice_temporal_mvp_enabled_flag is equal to 1), the variable ColPic representing the col-located picture is derived as follows:

If current slice is B slice and the signalled collocated_from_l0_flag is equal to 0, ColPic is set equal to RefPicList1 [collocated_ref_idx].

Otherwise (slice_type is equal to B and collocated_from_l0_flag is equal to 1, or slice_type is equal to P), ColPic is set equal to RefPicList0[collocated_ref_idx].

Herein, collocated_ref_idx and collocated_from_l0_flag are two syntax elements which may be signaled in slice header.

Figure 6:
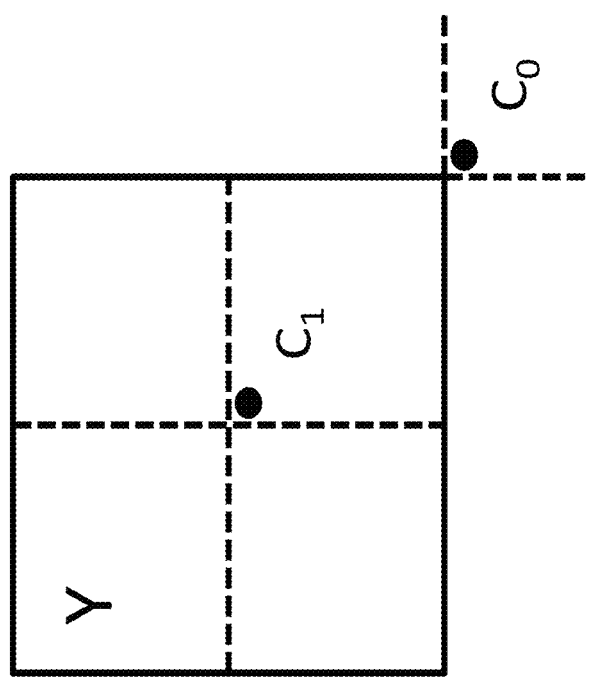
FIG. 6 shows examples of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU, which may also be referred to as a largest coding unit (LCU)) row, position C1 is used. Otherwise, position C0 is used in the derivation of the temporal merge candidate.

Related syntax elements are described as follows:
7.3.6.1 General Slice Segment Header Syntax

|  | Descriptor |
|---|---|
| slice_segment_header( ) { | |
|     first_slice_segment_in_pic_flag | u(1) |
|     ... | |
|     if( slice_type = = P \|\| slice_type = = B ) { | |
|         num_ref_idx_active_override_flag | u(1) |
|         if( num_ref_idx_active_override_flag ) { | |
|             num_ref_idx_l0_active_minus1 | ue(v) |
|             if( slice_type = = B ) | |
|                 num_ref_idx_l1_active_minus1 | ue(v) |
|         } | |

-continued

| | Descriptor |
|---|---|
| ... | |
|     if( slice_temporal_mvp_enabled_flag ) { | |
|       if( slice_type = = B ) | |
|         collocated_from_l0_flag | u(1) |
|       if( ( collocated_from_l0_flag && num_ref_idx_l0_active_minus1 > 0 ) \|\| ( !collocated_from l0 flag && num_ref_idx_l1 active minus1 > 0 ) ) | |
|         collocated_ref_idx | ue(v) |
|     } | |
| ... | |
|   byte_alignment( ) | |
| } | |

2.1.2.5 Derivation of MVs for the TMVP Candidate

More specifically, the following steps are performed in order to derive the TMVP candidate:

1) set reference picture list X=0, target reference picture to be the reference picture with index equal to 0 (i.e., curr_ref) in list X. Invoke the derivation process for collocated motion vectors to get the MV for list X pointing to curr_ref.
2) if current slice is B slice, set reference picture list X=1, target reference picture to be the reference picture with index equal to 0 (i.e., curr_ref) in list X. Invoke the derivation process for collocated motion vectors to get the MV for list X pointing to curr_ref.

The derivation process for collocated motion vectors is described in the next sub-section 2.1.2.5.1.

2.1.2.5.1 Derivation Process for Collocated Motion Vectors

For the co-located block, it may be intra or inter coded with uni-prediction or bi-prediction. If it is intra coded, TMVP candidate is set to be unavailable.

If it is uni-prediction from list A, the motion vector of list A is scaled to the target reference picture list X.

If it is bi-prediction and the target reference picture list is X, the motion vector of list A is scaled to the target reference picture list X, and A is determined according to the following rules:

If none of reference pictures has a greater POC values compared to current picture, A is set equal to X.

Otherwise, A is set equal to collocated_from_l0_flag.

2.1.2.6 Additional Candidates Insertion

Figure 7:
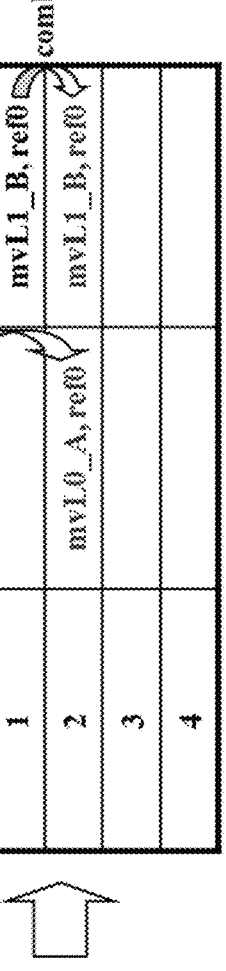
FIG. 7 shows an example of a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighboring PUS, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
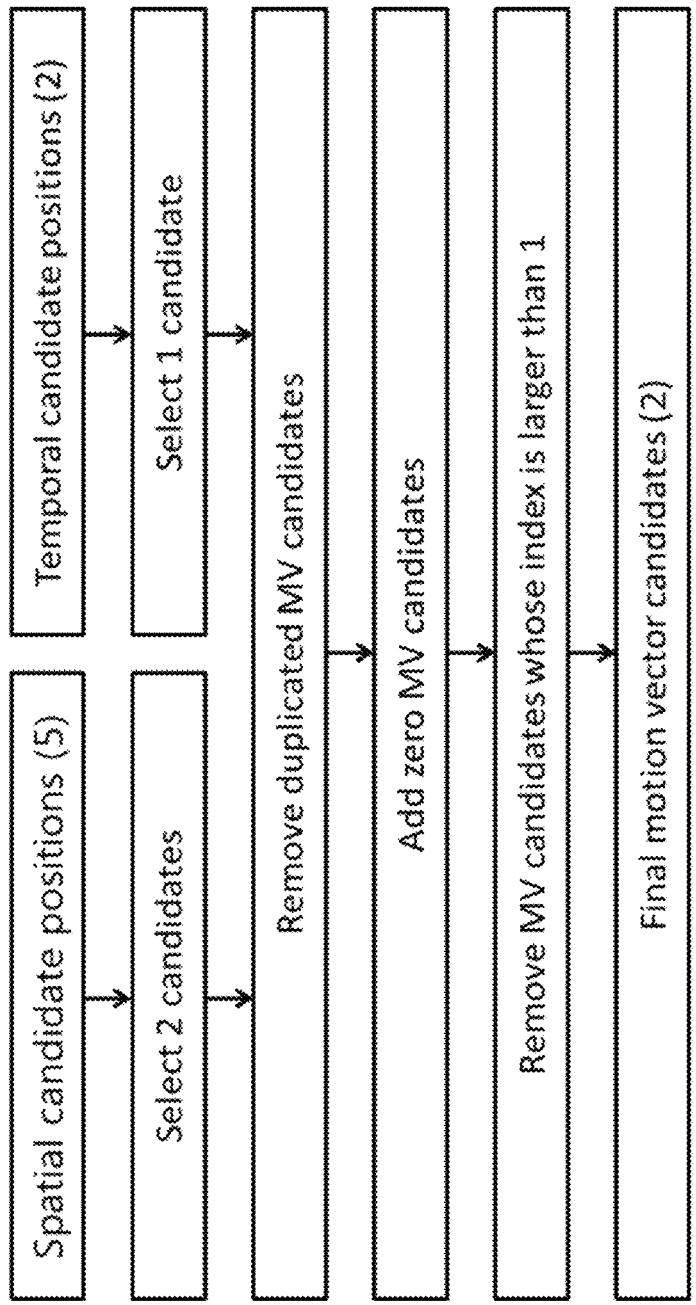
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
      (1) Same reference picture list, and same reference picture index (same POC)
      (2) Different reference picture list, but same reference picture (same POC)
    Spatial scaling
      (3) Same reference picture list, but different reference picture (different POC)
      (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
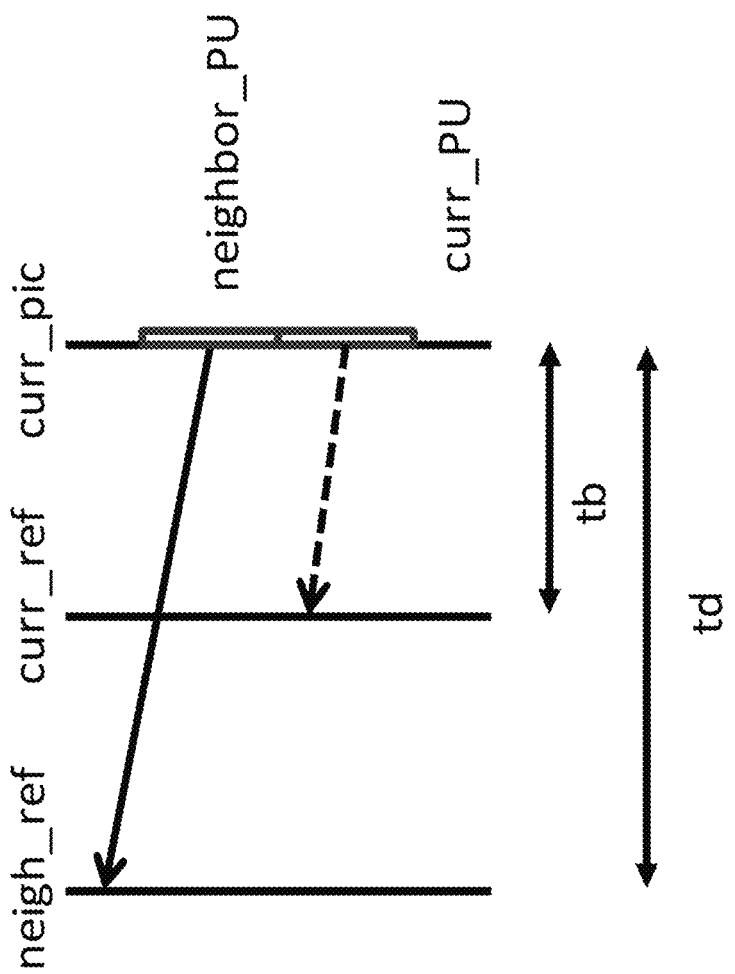
FIG. 9 shows an example of motion vector scaling for a spatial motion vector candidate.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, a.k.a., SbTMVP), affine prediction mode, Generalized Bi-Prediction (GBI), Decoder-side Motion Vector Refinement (DMVR) and Bi-directional Optical flow (BIO, a.k.a., BDOF).

There are three different merge list construction processes supported in VVC:

1) Sub-block merge candidate list: a sub-block merge candidate list includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Regular merge list: For inter-coded blocks, one merge list construction process is shared. Here, the spatial/temporal merge candidates, HMVP, pairwise merge candidates and zero motion candidates may be inserted in order. Regular merge list size is signaled in slice header, and maximum value is 6. MMVD, TPM, CIIP rely on the regular merge list.
3) IBC merge list: an IBC merge list is similar to the regular merge list.

Similarly, there are three AMVP lists supported in VVC:
1) Affine AMVP candidate list
2) Regular AMVP candidate list
3) IBC AMVP candidate list: the same construction process as the IBC merge list due to the adoption of JVET-N0843

2.2.1 Coding Block Structure in VVC

In VVC, a QuadTree/BinaryTree/MulitpleTree (QT/BT/TT) structure is adopted to divide a picture into square or rectangle blocks.

Besides QT/BT/TT, separate tree (a.k.a., Dual coding tree) is also adopted in VVC for I-frames. With separate tree, the coding block structure are signaled separately for the luma and chroma components.

In addition, the CU is set equal to PU and TU, except for blocks coded with specific coding methods (such as intra sub-partition prediction wherein PU is equal to TU, but smaller than CU, and sub-block transform for inter-coded blocks wherein PU is equal to CU, but TU is smaller than PU).

2.2.2 Affine Prediction Mode

Figure 10A:
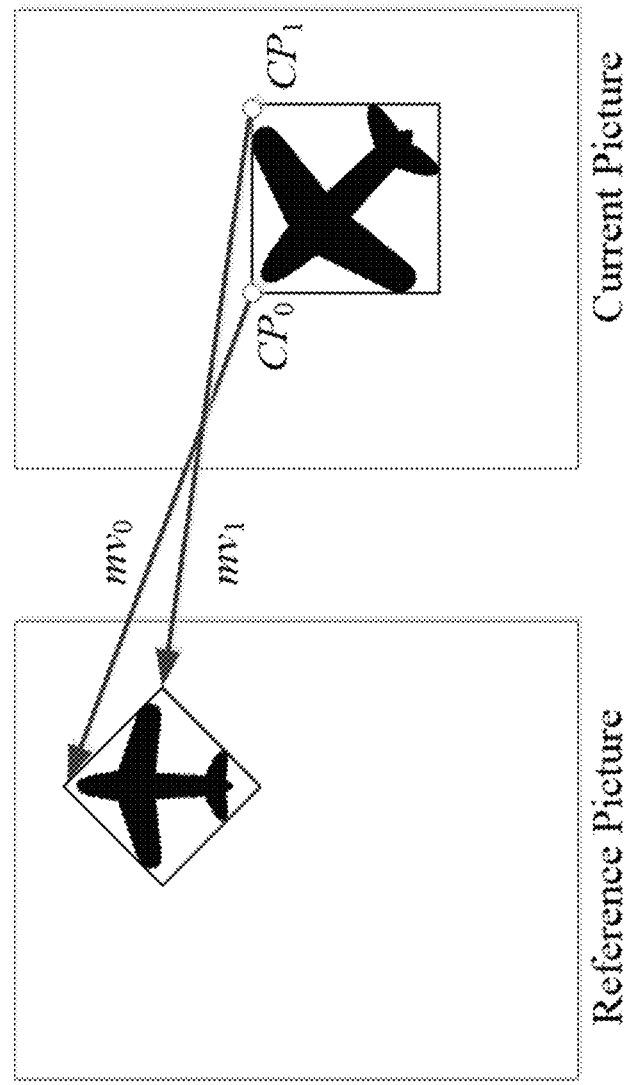
FIGS. 10A and 10B show examples of a simplified affine motion model.
Figure 10B:
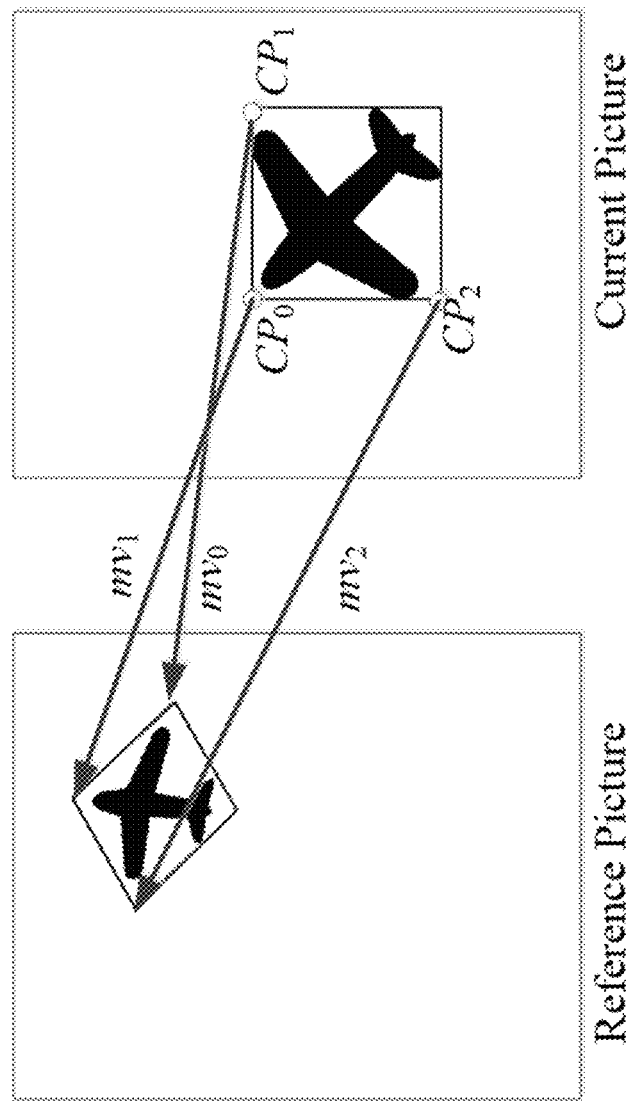

In HEVC, only translation motion model is applied for motion compensation prediction (MCP). While in the real world, there are many kinds of motion, e.g., zoom in/out, rotation, perspective motions and the other irregular motions. In VVC, a simplified affine transform motion compensation prediction is applied with 4-parameter affine model and 6-parameter affine model. As shown FIGS. 10A and 10B, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

Herein, $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VVC test model (VTM), the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 11:
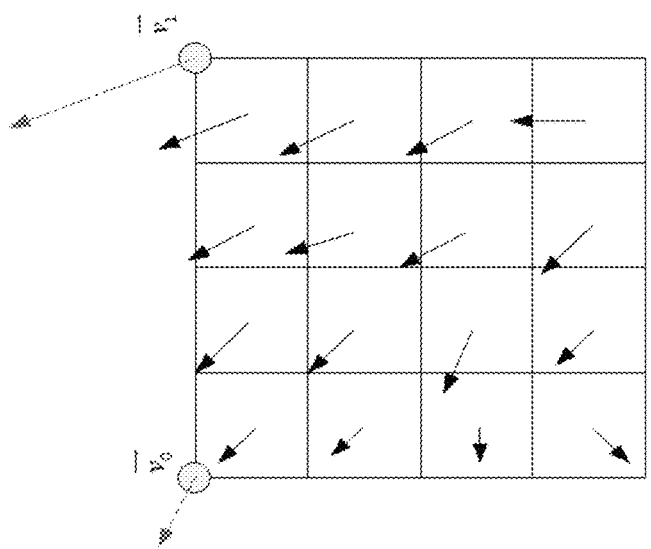
FIG. 11 shows an example of an affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 11, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.2.3 MERGE for Whole Block
2.2.3.1 Merge List Construction of Translational Regular Merge Mode
2.2.3.1.1 History-Based Motion Vector Prediction (HMVP)

Different from the merge list design, in VVC, the history-based motion vector prediction (HMVP) method is employed.

Figure 12:
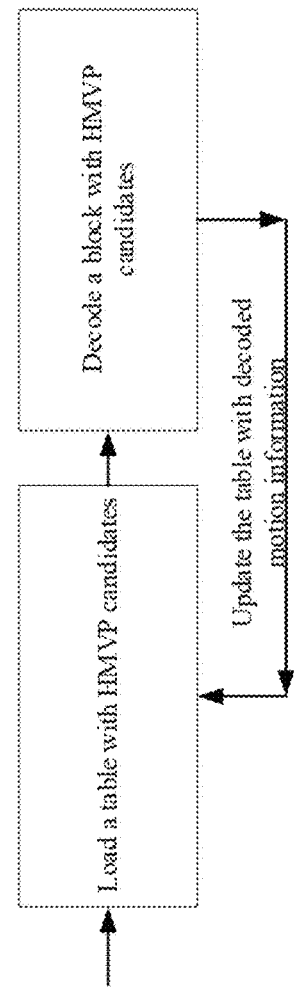
FIG. 12 shows an example of candidate positions for affine merge mode.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 12.

2.2.3.1.2 Regular Merge List Construction Process

Figure 13:
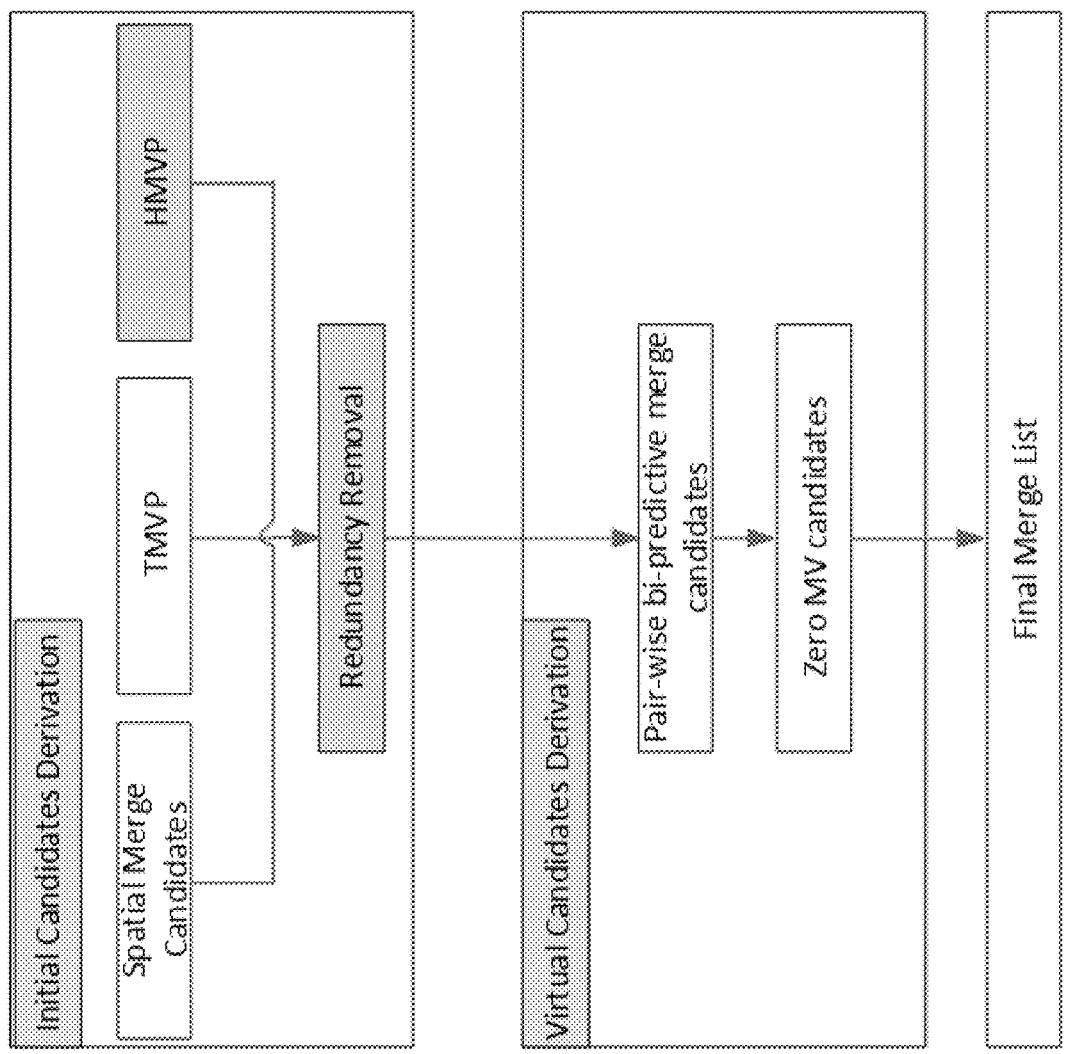
FIG. 13 shows an example of a modified merge list construction process.

The construction of the regular merge list (for translational motion) can be summarized according to the following sequence of steps:

Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 13 depicts The modified merge candidate list construction process (shaded in gray). When the merge candidate list is not full after the TMVP candidate insertion, HMVP candidates stored in the HMVP table could be utilized to fill in the merge candidate list. Considering that one block usually has a higher correlation with the nearest neighboring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.2.3.1.2.1 Pruning Processes

A candidate is only added to the list if the corresponding candidate used for redundancy check has not the same motion information. Such comparison process is called pruning process.

The pruning process among the spatial candidates is dependent on the usage of TPM for current block.

When current block is coded without TPM mode (e.g., regular merge, MMVD, CIIP), the HEVC pruning process (i.e., five pruning) for the spatial merge candidates is utilized.

2.2.3.1.2.2 Updating of HMVP Table

After decoding an inter-coded block with non-TPM, non-sub-block mode, the HMVP table is updated. Motion information of current block may be firstly pruned to all available HMVP candidates in the HMVP table. If there is one identical one found, the redundant one is removed from the table, and all the remaining are pushed forward with index minus 1. Then the motion information of current block is added to the HMVP table.

If the counter (which records number of available HMVP candidates in the table), denoted by K is smaller than 5, K is increased by 1. Otherwise, K is kept unchanged.

The related specification is defined as follows:
8.5.2.16 Updating Process for the History-Based Motion Vector Predictor Candidate List Inputs to this process are:
luma motion vectors in 1/16 fractional-sample accuracy mvL0 and mvL1,
reference indices refIdxL0 and refIdxL1,
prediction list utilization flags predFlagL0 and predFlagL1,
bi-prediction weight index bcwIdx.

The MVP candidate hMvpCand consists of the luma motion vectors mvL0 and mvL1, the reference indices refIdxL0 and refIdxL1, the prediction list utilization flags predFlagL0 and predFlagL1, and the bi-prediction weight index bcwIdx.

The candidate list HmvpCandList is modified using the candidate hMvpCand by the following ordered steps:

1. The variable identicalCandExist is set equal to FALSE and the variable removeIdx is set equal to 0.
2. When NumHmvpCand is greater than 0, for each index hMvpIdx with hMvpIdx=0 . . . NumHmvpCand−1, the following steps apply until identicalCandExist is equal to TRUE:
   When hMvpCand is equal to HmvpCandList[hMvpIdx], identicalCandExist is set equal to TRUE and removeIdx is set equal to hMvpIdx.
3. The candidate list HmvpCandList is updated as follows:
   If identicalCandExist is equal to TRUE or NumHmvpCand is equal to MaxNumMergeCand−1, the following applies:
   For each index i with i=(removeIdx+1) . . . (NumHmvpCand−1), HmvpCandList[i−1] is set equal to HmvpCandList[i].
   HmvpCandList[NumHmvpCand−1] is set equal to mvCand.
   Otherwise (identicalCandExist is equal to FALSE and NumHmvpCand is less than MaxNumMergeCand−1), the following applies:
   HmvpCandList[NumHmvpCand++] is set equal to mvCand.

Here, MaxNumMergeCand is set to 5.

2.2.4 Triangular Prediction Mode (TPM)

In VVC, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signaled to indicate whether the triangle partition mode is applied or not.

When this mode is used, a CU is split evenly into two triangle-shaped partitions, using either the diagonal split or the anti-diagonal split, as depicted in FIG. 14. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights.

This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.2.4.1 Merge List Construction Process for TPM

Basically, the regular merge list construction process is applied as proposed in JVET-N0340. However, some modifications are added.

Specifically, the following modifications are applied:
1) How to do the pruning process is dependent on the usage of TPM for current block.
   If the current block is not coded with TPM, the HEVC 5 pruning applied to spatial merge candidates is invoked.
   Otherwise (if the current block is coded with TPM), full pruning is applied when adding a new spatial merge candidates. That is, B1 is compared to A1; B0 is compared to Aland B1; A0 is compared to A1, B1, and B0; B2 is compared to A1, B1, A0, and B0.
2) The condition on whether to check of motion information from B2 is dependent on the usage of TPM for current block.
   If the current block is not coded with TPM, B2 is accessed and checked only when there are less than 4 spatial merge candidates before checking B2.
   Otherwise (if the current block is coded with TPM), B2 is always accessed and checked regardless how many available spatial merge candidates before adding B2.

2.2.4.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

1st weighting factor group: {7/8, 6/8, 4/8, 2/8, 1/8} and {7/8, 4/8, 1/8} are used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

Weighting factor group is selected based on the comparison of the motion vectors of two triangular prediction units. The 2nd weighting factor group is used when any one of the following condition is true:
  the reference pictures of the two triangular prediction units are different from each other.
  absolute value of the difference of two motion vectors' horizontal values is larger than 16 pixels.
  absolute value of the difference of two motion vectors' vertical values is larger than 16 pixels.

Figure 15:
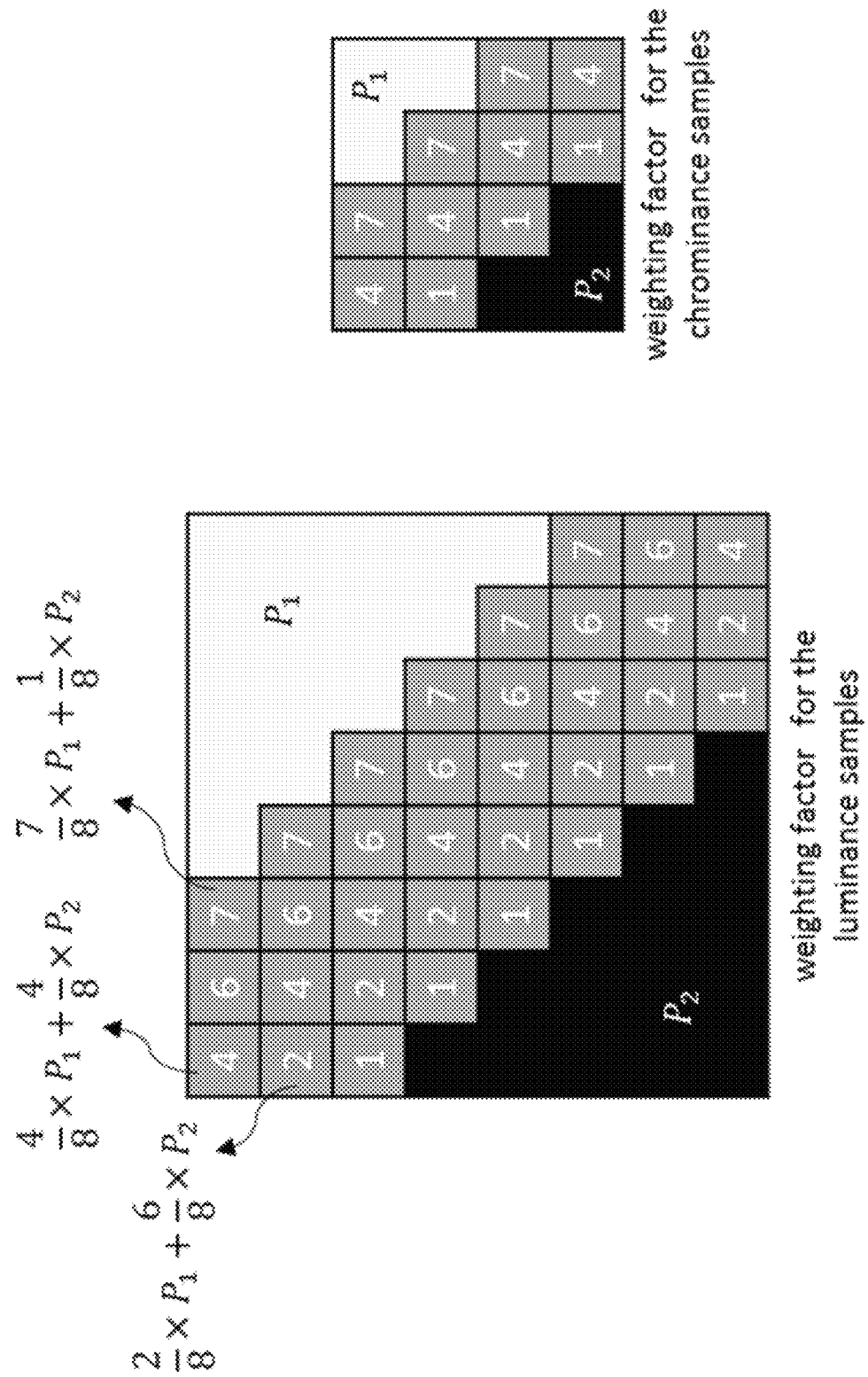
FIG. 15 shows an example in which a CU applies the 1st weighting factor group.

Otherwise, the 1st weighting factor group is used. An example is shown in FIG. 15.

2.2.4.3 Motion Vector Storage

Figure 16:
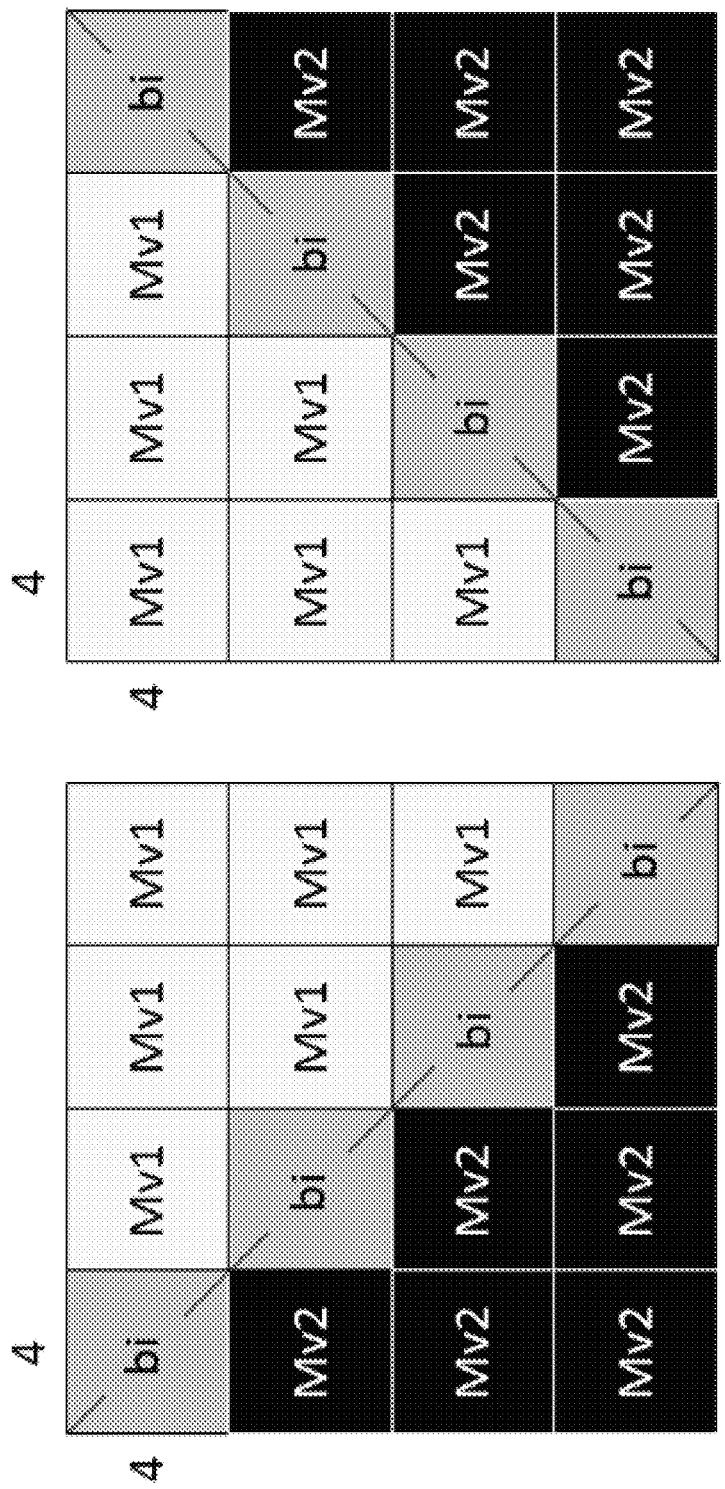
FIG. 16 shows an example of motion vector storage implementation.

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:
1) In the case that Mv1 and Mv2 have motion vector from different directions (L0 or L1), Mv1 and Mv2 are simply combined to form the bi-prediction motion vector.
2) In the case that both Mv1 and Mv2 are from the same L0 (or L1) direction,
   If the reference picture of Mv2 is the same as a picture in the L1 (or L0) reference picture list, Mv2 is scaled to the picture. Mv1 and the scaled Mv2 are combined to form the bi-prediction motion vector.
   If the reference picture of Mv1 is the same as a picture in the L1 (or L0) reference picture list, Mv1 is scaled to the picture. The scaled Mv1 and Mv2 are combined to form the bi-prediction motion vector.
   Otherwise, only Mv1 is stored for the weighted area.

2.2.4.4 Syntax Tables, Semantics and Decoding Process for Merge Mode 7.3.5.1 General Slice Header Syntax

|  | Descriptor |
|---|---|
| slice_header( ) { |  |
|    slice_pic_parameter_set_id | ue(v) |
|    if( rect_slice_flag \|\| NumBricksInPic > 1 ) |  |
|       slice_address | u(v) |
|    if( !rect_slice_flag && !single_brick_per_slice_flag ) |  |
|       num_bricks_in_slice_minus1 | ue(v) |
|    slice_type | ue(v) |
| ... |  |
|    if ( slice_type != I ) { |  |
|       if( sps_temporal_mvp_enabled_flag ) |  |
|          slice_temporal_mvp_enabled_flag | u(1) |
|       if( slice_type = = B ) |  |
|          mvd_l1_zero_flag | u(1) |
|       if( cabac_init_present_flag ) |  |
|          cabac_init_flag | u(1) |
|       if( slice_temporal_mvp_enabled_flag ) { |  |
|          if( slice_type = = B ) |  |
|             collocated_from_l0_flag | u(1) |
|    } |  |

-continued

|  | Descriptor |
|---|---|
| if( ( weighted_pred_flag && slice_type = = P ) \|\| | |
| ( weighted_bipred_flag && slice_type = = B ) ) | |
| pred_weight_table( ) | |
| six_minus_max_num_merge_cand | ue(v) |
| if( sps_affine_enabled_flag ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_triangle_enabled_flag && MaxNumMergeCand >= 2 ) | |
| max_num_merge_cand_minus_max_num_triangle_cand | ue(v) |
| } else if ( sps_ibc_enabled_flag ) | |
| six_minus_max_num_merge_cand | ue(v) |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| ... | |
| byte_alignment( ) | |
| } | |

7.3.7.5 Coding Unit Syntax

|  | Descriptor |
|---|---|
| coding_unit( x0, y0, cbWidth, cbHeight, treeType ) { | |
|     if( slice_type != I \|\| sps_ibc_enabled_flag ) { | |
|       if( treeType ! = DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][y0 ] = = 0 && slice_type != I | |
|     && !( cbWidth = = 4 && cbHeight = = 4 ) ) | |
|     pred_mode_flag | ae(v) |
|     if( ( ( slice_type = = I && cu_skip_flag[ x0 ][ y0 ] = = 0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][y0 ] = = | |
| 0 ) ) ) ) && | |
|     sps_ibc_enabled_flag && ( cbWidth != 128 \|\| cbHeight != 128 ) ) | |
|     pred_mode_ibc_flag | ae(v) |
|   } | |
|   if( CuPredMode[ x0 ][ y0 ] = = MODE_INTRA ) { | |
| ... | |
|   } | |
|   } else if( treeType != DUAL_TREE_CHROMA ) { /* MODE_INTER or MODE_IBC */ | |
|     if( cu_skip_flag[ x0 ][ y0 ] = = 0 ) | |
|     general_merge_flag[ x0 ][ y0 ] | ae(v) |
|   if( general_merge_flag[ x0 ][ y0 ] ) { | |
|   merge_data( x0, y0, cbWidth, cbHeight ) | |
|   } else if ( CuPredMode[ x0 ][ y0 ] = = MODE_IBC ) { | |
|   mvd_coding( x0, y0, 0, 0 ) | |
|   mvp_l0_flag[ x0 ][ y0 ] | ae(v) |
|   if( sps_amvr_enabled_flag && | |
|     ( MvdL0[ x0 ][ y0 ][ 0 ] != 0 \|\| MvdL0[ x0 ][ y0 ][ 1 ] != 0 ) ) { | |
|     amvr_precision_flag[ x0 ][ y0 ] | ae(v) |
|   } | |
|   } else { | |
|   if( slice_type = = B ) | |
|     inter_pred_idc[ x0 ][ y0 ] | ae(v) |
|   if( sps_affine_enabled_flag && cbWidth >=16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( sps_smvd_enabled_flag && inter_pred_idc[ x0 ][ y0 ] = = PRED_BI && | |
|   !inter_affine_flag[ x0 ][ y0 ] && RefIdxSymL0 >-1 && RefIdxSymL1 >-1 ) | |
|   sym_mvd_flag[ x0 ][ y0 ] | ae(v) |
| ... | |
|   } | |
| } | |

7.3.7.7 Merge Data Syntax

|  | Descriptor |
|---|---|
| merge_data( x0, y0, cbWidth, cbHeight ) { | |
|     if ( CuPredMode[ x0 ][ y0 ] = = MODE_IBC ) { | |
|       if( MaxNumMergeCand > 1 ) | |
|         merge_idx[ x0 ][ y0 ] | ae(v) |
|     } else { | |
|       if( sps_mmvd_enabled_flag \|\| cbWidth * cbHeight != 32 ) | |
|         regular_merge_flag[ x0 ][ y0 ] | ae(v) |
|       if ( regular_merge_flag[ x0 ][ y0 ] = = 1 ){ | |
|         if( MaxNumMergeCand > 1 ) | |
|           merge_idx[ x0 ][ y0 ] | ae(v) |
|       } else { | |
|         if( sps_mmvd_enabled_flag && cbWidth * cbHeight != 32 ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumSubblockMergeCand > 0 && cbWidth >= 8 && cbHeight >= 8 ) | |
|             merge_subblock_flag[ x0 ][ y0 ] | ae(v) |
|           if( merge_subblock_flag[ x0 ][ y0 ] = = 1 ) { | |
|             if( MaxNumSubblockMergeCand > 1 ) | |
|               merge subblock idx[ x0 ][ y0 ] | ae(v) |
|           } else { | |
|             if( sps_ciip_enabled_flag && cu_skip_flag[ x0 ][ y0 ] = = 0 && ( cbWidth * cbHeight ) >= 64 && cbWidth < 128 && cbHeight < 128 ) { | |
|               ciip_flag[ x0 ][ y0 ] | ae(v) |
|             if( ciip_flag[ x0 ][ y0 ] && MaxNumMergeCand > 1 ) | |
|               merge_idx[ x0 ][ y0 ] | ae(v) |
|             } | |
|             if( MergeTriangleFlag[ x0 ][ y0 ] ) { | |
|               merge_triangle_split_dir[ x0 ][ y0 ] | ae(v) |
|               merge_triangle_idx0[ x0 ][ y0 ] | ae(v) |
|               merge_triangle_idx1[ x0 ][ y0 ] | ae(v) |
|             } | |
|           } | |
|         } | |
|       } | |
|     } | |
| } | |

7.4.6.1 General slice header semantics six_minus_max_num_merge_cand specifies the maximum number of merging motion vector prediction (MVP) candidates supported in the slice subtracted from 6. The maximum number of merging MVP candidates, MaxNumMergeCand is derived as follows:

$$\text{MaxNumMergeCand}=6-\text{six\_minus\_max\_num\_merge\_cand} \quad (7\text{-}57)$$

The value of MaxNumMergeCand shall be in the range of 1 to 6, inclusive.

five_minus_max_num_subblock_merge_cand specifies the maximum number of subblock-based merging motion vector prediction (MVP) candidates supported in the slice subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

$$\text{MaxNumSubblockMergeCand}=5-\text{five\_minus\_max\_num\_subblock\_merge\_cand} \quad (7\text{-}58)$$

The value of MaxNumSubblockMergeCand shall be in the range of 0 to 5, inclusive.

7.4.8.5 Coding Unit Semantics pred_mode_flag equal to 0 specifies that the current coding unit is coded in inter prediction mode. pred_mode_flag equal to 1 specifies that the current coding unit is coded in intra prediction mode. When pred_mode_flag is not present, it is inferred as follows:
  If cbWidth is equal to 4 and cbHeight is equal to 4, pred_mode_flag is inferred to be equal to 1.
  Otherwise, pred_mode_flag is inferred to be equal to 1 when decoding an I slice, and equal to 0 when decoding a P or B slice, respectively.
The variable CuPredMode[x][y] is derived as follows for x=x0 . . . x0+cbWidth−1 and y=y0 . . . y0+cbHeight−1:
  If pred_mode_flag is equal to 0, CuPredMode[x][y] is set equal to MODE_INTER.
  Otherwise (pred_mode_flag is equal to 1), CuPredMode [x][y] is set equal to MODE_INTRA.
pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:
  If cu_skip_flag[x0][y0] is equal to 1, and cbWidth is equal to 4, and cbHeight is equal to 4, pred_mode_ibc_flag is inferred to be equal 1.
  Otherwise, if both cbWidth and cbHeight are equal to 128, pred_mode_ibc_flag is inferred to be equal to 0.
  Otherwise, pred_mode_ibc_flag is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

general_merge_flag[x0][y0] specifies whether the inter prediction parameters for the current coding unit are inferred from a neighboring inter-predicted partition. The array indices x0, y0 specify the location (x0, y0) of the top-left luma sample of the considered coding block relative to the top-left luma sample of the picture.

When general_merge_flag[x0][y0] is not present, it is inferred as follows:

If cu_skip_flag[x0][y0] is equal to 1, general_merge_flag [x0][y0] is inferred to be equal to 1.

Otherwise, general_merge_flag[x0][y0] is inferred to be equal to 0.

mvp_l0_flag[x0][y0] specifies the motion vector predictor index of list 0 where x0, y0 specify the location (x0, y0) of the top-left luma sample of the considered coding block relative to the top-left luma sample of the picture.

When mvp_l0_flag[x0][y0] is not present, it is inferred to be equal to 0.

mvp_l1_flag[x0][y0] has the same semantics as mvp_l0_flag, with l0 and list 0 replaced by l1 and list 1, respectively.

inter_pred_idc[x0][y0] specifies whether list0, list1, or bi-prediction is used for the current coding unit according to Table 7-10. The array indices x0, y0 specify the location (x0, y0) of the top-left luma sample of the considered coding block relative to the top-left luma sample of the picture.

If all the following conditions are true, regular_merge_flag[x0][y0] is inferred to be equal to 1:
    sps_mmvd_enabled_flag is equal to 0.
    general_merge_flag[x0][y0] is equal to 1.
    cbWidth*cbHeight is equal to 32.

Otherwise, regular_merge_flag[x0][y0] is inferred to be equal to 0.

mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_merge_flag[x0][y0] is not present, it is inferred as follows:

If all the following conditions are true, mmvd_merge_flag [x0][y0] is inferred to be equal to 1:
        sps_mmvd_enabled_flag is equal to 1.
        general_merge_flag[x0][y0] is equal to 1.
        cbWidth*cbHeight is equal to 32.
        regular_merge_flag[x0][y0] is equal to 0.

Otherwise, mmvd_merge_flag[x0][y0] is inferred to be equal to 0.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the

TABLE 7-10

Name association to inter prediction mode

| | Name of inter_pred_idc | | |
|---|---|---|---|
| inter_pred_idc | ( cbWidth + cbHeight ) > 12 | ( cbWidth + cbHeight ) == 12 | ( cbWidth + cbHeight ) == 8 |
| 0 | PRED_L0 | PRED_L0 | n.a. |
| 1 | PRED_L1 | PRED_L1 | n.a. |
| 2 | PRED_BI | n.a. | n.a. |

When inter_pred_idc[ x0 ][ y0 ] is not present, it is inferred to be equal to PRED_L0.

7.4.8.7 Merge Data Semantics regular_merge_flag[x0][y0] equal to 1 specifies that regular merge mode is used to generate the inter prediction parameters of the current coding unit. The array indices x0, y0 specify the location (x0, y0) of the top-left luma sample of the considered coding block relative to the top-left luma sample of the picture.

When regular_merge_flag[x0][y0] is not present, it is inferred as follows:

top-left luma sample of the considered coding block relative to the top-left luma sample of the picture.

When mmvd_cand_flag[x0][y0] is not present, it is inferred to be equal to 0.

mmvd_distance_idx[x0][y0] specifies the index used to derive MmvdDistance[x0][y0] as specified in Table 7-12. The array indices x0, y0 specify the location (x0, y0) of the top-left luma sample of the considered coding block relative to the top-left luma sample of the picture.

TABLE 7-12

Specification of MmvdDistance[ x0 ][ y0 ] based on mmvd_distance_idx[ x0 ][ y0 ].

| | MmvdDistance[ x0 ][ y0 ] | |
|---|---|---|
| mmvd_distance_idx[ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |

TABLE 7-12-continued

Specification of MmvdDistance[ x0 ][ y0 ] based on mmvd_distance_idx[ x0 ][ y0 ].

| mmvd_distance_idx[ x0 ][ y0 ] | MmvdDistance[ x0 ][ y0 ] | |
|---|---|---|
| | slice_fpel_mmvd_enabled_flag == 0 | slice_fpel_mmvd_enabled_flag == 1 |
| 6 | 64 | 256 |
| 7 | 128 | 512 | mmvd_direction_idx[x0][y0] specifies index used to derive MmvdSign[x0][y0] as specified in Table 7-13. The array indices x0, y0 specify the location (x0, y0) of the top-left luma sample of the considered coding block relative to the top-left luma sample of the picture.

TABLE 7-13

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[x0][y0][0]=(MmvdDistance[x0][y0]<<2)*MmvdSign[x0][y0][0]  (7-124)

MmvdOffset[x0][y0][1]=(MmvdDistance[x0][y0]<<2)*MmvdSign[x0][y0][1]  (7-125)

merge_subblock_flag[x0][y0] specifies whether the subblock-based inter prediction parameters for the current coding unit are inferred from neighboring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

When ciip_flag[x0][y0] is equal to 1, the variable IntraPredModeY[x][y] with x=xCb . . . xCb+cbWidth−1 and y=yCb . . . yCb+cbHeight−1 is set to be equal to INTRA_PLANAR.

The variable MergeTriangleFlag[x0][y0], which specifies whether triangular shape based motion compensation is used to generate the prediction samples of the current coding unit, when decoding a B slice. is derived as follows:

If all the following conditions are true, MergeTriangleFlag[x0][y0] is set equal to 1:

sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
mmvd_merge_flag[x0][y0] is equal to 0.
merge_subblock_flag[x0][y0] is equal to 0.
ciip_flag[x0][y0] is equal to 0.
Otherwise, MergeTriangleFlag[x0][y0] is set equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0. merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:

If mmvd_merge_flag[x0][y0] is equal to 1, merge_idx[x0][y0] is inferred to be equal to mmvd_cand_flag[x0][y0].

Otherwise (mmvd_merge_flag[x0][y0] is equal to 0), merge_idx[x0][y0] is inferred to be equal to 0.

2.2.4.4.1 Decoding Process

The decoding process as provided in the JVET-N0340 is defined as follows:

8.5.2.2 Derivation Process for Luma Motion Vectors for Merge Mode

This process is only invoked when general_merge_flag [xCb][yCb] is equal to 1, where (xCb, yCb) specify the top-left sample of the current luma coding block relative to the top-left luma sample of the current picture.

Inputs to this process are:
 a luma location (xCb, yCb) of the top-left sample of the current luma coding block relative to the top-left luma sample of the current picture.
 a variable cbWidth specifying the width of the current coding block in luma samples.
 a variable cbHeight specifying the height of the current coding block in luma samples.

Outputs of this process are:
 the luma motion vectors in 1/16 fractional-sample accuracy mvL0[0][0] and mvL1[0][0].
 the reference indices refIdxL0 and refIdxL1.
 the prediction list utilization flags predFlagL0[0][0] and predFlagL1[0][0].
 the bi-prediction weight index bcwIdx.
 the merging candidate list mergeCandList.

The bi-prediction weight index bcwIdx is set equal to 0.

The motion vectors mvL0[0][0] and mvL1[0][0], the reference indices refIdxL0 and refIdxL1 and the prediction utilization flags predFlagL0[0][0] and predFlagL1[0][0] are derived by the following ordered steps:

1. The derivation process for spatial merging candidates from neighboring coding units as specified in clause 8.5.2.3 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices bcwIdx$A_0$, bcwIdx$A_1$, bcwIdx$B_0$, bcwIdx$B_1$, bcwIdx$B_2$.

2. The reference indices, refIdxLXCol, with X being 0 or 1, and the bi-prediction weight index bcwIdxCol for the temporal merging candidate Col are set equal to 0.

3. The derivation process for temporal luma motion vector prediction as specified in in clause 8.5.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

availableFlagCol=availableFlagL0Col (8-263)

predFlagL0Col=availableFlagL0Col (8-264)

predFlagL1Col=0 (8-265)

4. When slice_type is equal to B, the derivation process for temporal luma motion vector prediction as specified in clause 8.5.2.11 is invoked with the luma location (xCb, yCb), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:

availableFlagCol=availableFlagL0Col||availableFlagL1Col (8-266)

predFlagL1Col=availableFlagL1Col (8-267)

5. The merging candidate list, mergeCandList, is constructed as follows:

```
i = 0
if( availableFlagA₁ )
    mergeCandList[ i++ ] = A₁
if( availableFlagB₁ )
    mergeCandList[ i++ ] = B₁
if( availableFlagB₀ )
    mergeCandList[ i++ ] = B₀      (8-268)
if( availableFlagA₀ )
    mergeCandList[ i++ ] = A₀
if( availableFlagB₂ )
    mergeCandList[ i++ ] = B₂
if( availableFlagCol )
    mergeCandList[ i++ ] = Col
```

6. The variable numCurrMergeCand and numOrigMergeCand are set equal to the number of merging candidates in the mergeCandList.

7. When numCurrMergeCand is less than (MaxNumMergeCand−1) and NumHmvpCand is greater than 0, the following applies:
 The derivation process of history-based merging candidates as specified in 8.5.2.6 is invoked with mergeCandList and numCurrMergeCand as inputs, and modified mergeCandList and numCurrMergeCand as outputs.
 numOrigMergeCand is set equal to numCurrMergeCand.

8. When numCurrMergeCand is less than MaxNumMergeCand and greater than 1, the following applies:
 The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, and numCurrMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index bcwIdx of candidate avgCand being added into mergeCandList is set equal to 0.
 numOrigMergeCand is set equal to numCurrMergeCand.

9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCandm and refIdxL1zeroCandm, the prediction list utilization flags predFlagL0zeroCandm and predFlagL1zeroCandm and the motion vectors mvL0zeroCandm and mvL1zeroCandm of every new candidate zeroCandm being added into mergeCandList. The bi-prediction weight index bcwIdx of every new candidate zeroCandm being added into mergeCandList is set equal to 0. The number of candidates being added, numZeroMergeCand, is set equal to (numCurrMergeCand−numOrigMergeCand). When numZeroMergeCand is greater than 0, m ranges from 0 to numZeroMergeCand−1, inclusive.

10. The following assignments are made with N being the candidate at position merge_idx[xCb][yCb] in the merging candidate list mergeCandList (N=mergeCandList[merge_idx[xCb][yCb]]) and X being replaced by 0 or 1:

refIdxLX=refIdxLXN (8-269)

predFlagLX[0][0]=predFlagLXN (8-270)

mvLX[0][0][0]=mvLXN[0] (8-271)

mvLX[0][0][1]=mvLXN[1] (8-272)

bcwIdx=bcwIdxN (8-273)

11. When mmvd_merge_flag[xCb][yCb] is equal to 1, the following applies:

The derivation process for merge motion vector difference as specified in 8.5.2.7 is invoked with the luma location (xCb, yCb), the reference indices refIdxL0, refIdxL1 and the prediction list utilization flags predFlagL0[0][0] and predFlagL1 [0][0] as inputs, and the motion vector differences mMvdL0 and mMvdL1 as outputs.

The motion vector difference mMvdLX is added to the merge motion vectors mvLX for X being 0 and 1 as follows:

mvLX[0][0][0]+=mMvdLX[0] (8-274)

mvLX[0][0][1]+=mMvdLX[1] (8-275)

mvLX[0][0][0]=Clip3(−$2^{17}$,$2^{17}$−1,mvLX[0][0][0]) (8-276)

mvLX[0][0][1]=Clip3(−$2^{17}$,$2^{17}$−1,mvLX[0][0][1]) (8-277)

2.2.5 MMVD

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 17:
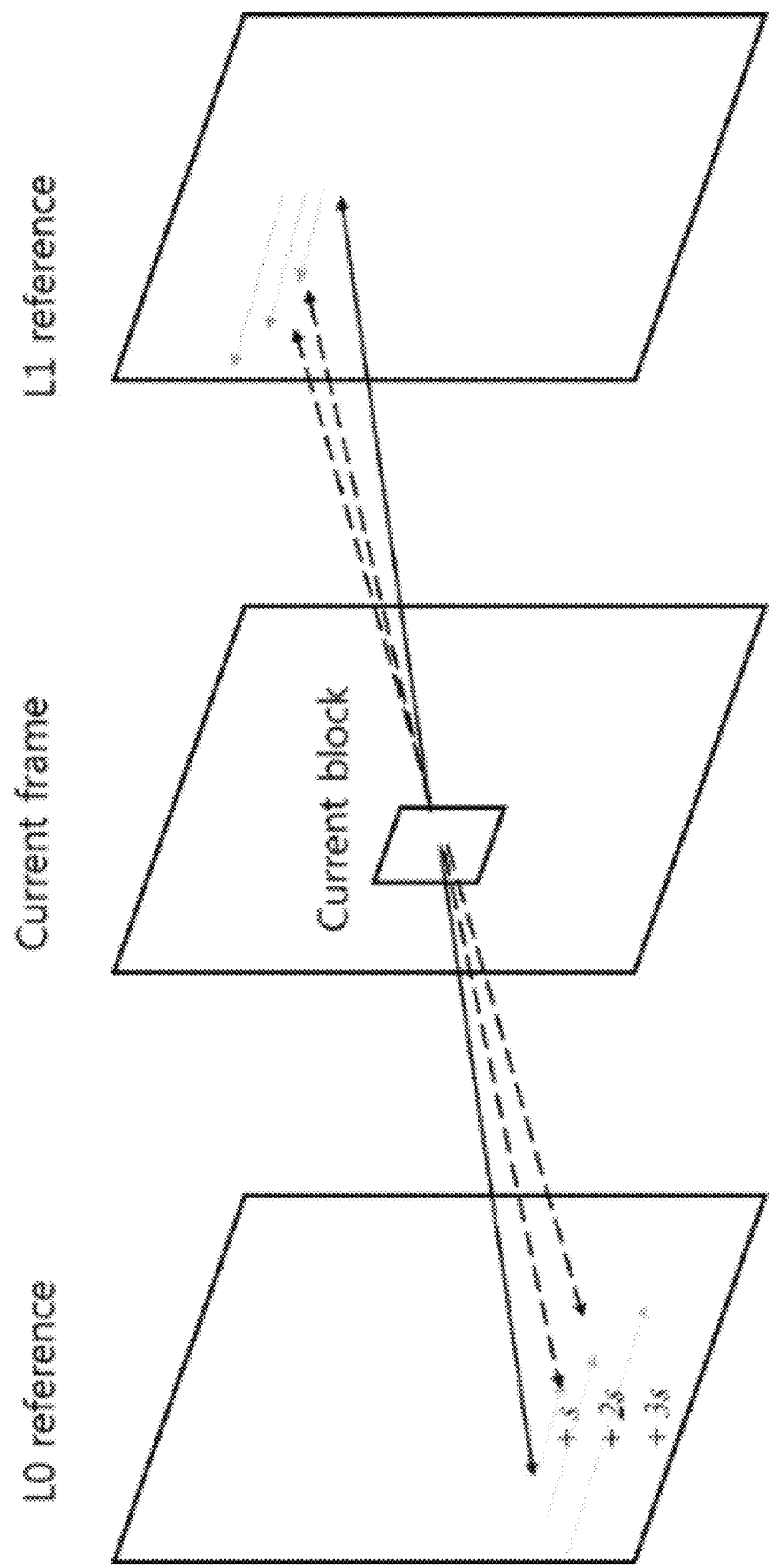
FIG. 17 shows an example of an Ultimate Motion Vector Expression (UMVE) search process.

FIG. 17 shows an example of UMVE Search Process
FIG. 18 shows examples of UMVE Search Points.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.2.6 Combined Intra-Inter Prediction (CIIP)

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.2.7 MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
  a) ATMVP candidate (maybe available or unavailable);
  b) Affine merge lists (including Inherited Affine candidates and Constructed Affine candidates); and
  c) Padding as zero motion vector (MV) 4-parameter affine model.

2.2.7.1 ATMVP (a.k.a., Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

In current design, ATMVP predicts the motion vectors of the sub-CUs within a CU in two steps which are described in the following two sub-sections, respectively.

2.2.7.1.1 Derivation of Initialized Motion Vector

Denote the initialized motion vector by tempMv. When block A1 is available and non-intra coded (i.e., coded with inter or IBC mode), the following is applied to derive the initialized motion vector.

If all of the following conditions are true, tempMv is set equal to the motion vector of block A1 from list 1, denoted by mvL1A1:
  Reference picture index of list 1 is available (not equal to −1), and it has the same POC value as the collocated picture (i.e., DiffPicOrderCnt(ColPic, RefPicList[1][refIdxL1A1]) is equal to 0),
  All reference pictures are with no larger POC compared to the current picture (i.e., DiffPicOrderCnt(aPic, currPic) is less than or equal to 0 for every picture aPic in every reference picture list of the current slice),
  Current slice is equal to B slice,
  collocated_from_l0_flag is equal to 0.
Otherwise if all of the following conditions are true, tempMv is set equal to the motion vector of block A1 from list 0, denoted by mvL0A1:
  Reference picture index of list 0 is available (not equal to −1),
  it has the same POC value as the collocated picture (i.e., DiffPicOrderCnt (ColPic, RefPicList[0][refIdxL0A1]) is equal to 0).
Otherwise, zero motion vector is used as the initialized MV.

A corresponding block (with center position of current block plus the rounded MV, clipped to be in certain ranges in necessary) is identified in the collocated picture signaled at the slice header with the initialized motion vector.

If the block is inter-coded, then go to the 2nd step. Otherwise, the ATMVP candidate is set to be NOT available.

2.2.7.1.2 Sub-CU Motion Derivation

The second step is to split the current CU into sub-CUs and obtain the motion information of each sub-CU from the block corresponding to each sub-CU in the collocated picture.

If the corresponding block for a sub-CU is coded with inter mode, the motion information is utilized to derive the final motion information of current sub-CU by invoking the derivation process for collocated MVs which is not different with the process for conventional TMVP process. Basically, if the corresponding block is predicted from the target list X for uni-prediction or bi-prediction, the motion vector is utilized; otherwise, if it is predicted from list Y (Y=1−X) for uni or bi-prediction and NoBackwardPredFlag is equal to 1, MV for list Y is utilized. Otherwise, no motion candidate could be found.

If the block in the collocated picture identified by the initialized MV and location of current sub-CU is intra or IBC coded, or no motion candidate could be found as described above, the following further apply:

Denote the motion vector used to fetch the motion field in the collocated picture Rcol as MVcol. To minimize the impact due to MV scaling, the MV in the spatial candidate list used to derive MVcol is selected in the following way: if the reference picture of a candidate MV is the collocated picture, this MV is selected and used as MVcol without any scaling. Otherwise, the MV having a reference picture closest to the collocated picture is selected to derive MVcol with scaling.

2.2.8 Refinement of Motion Information 2.2.8.1 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 19:
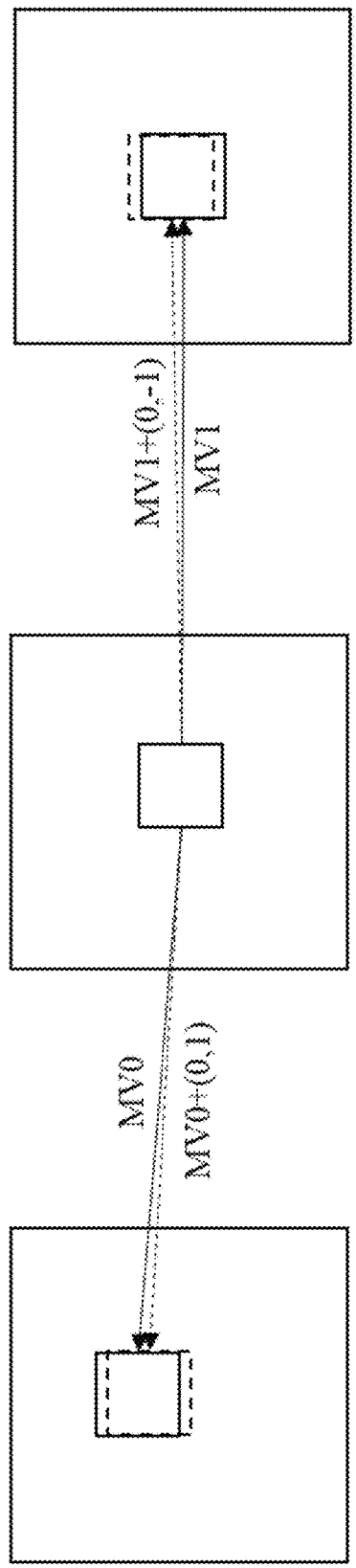
FIG. 19 shows an example of motion vector difference (MVD) (0, 1) mirrored between list 0 and list 1 in DMVR.

For DMVR in VVC, MVD mirroring between list 0 and list 1 is assumed as shown in FIG. 19, and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 20:
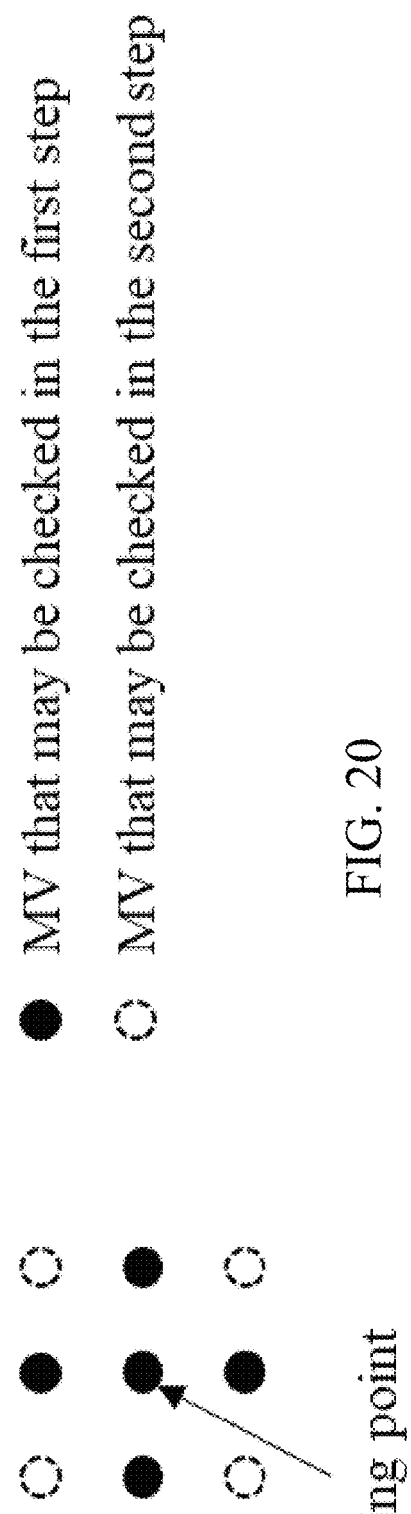
FIG. 20 shows examples of motion vectors (MVs) that may be checked in one iteration.

The motion vector refinement process may iterate twice. In each iteration, at most 6 MVDs (with integer-pel precision) may be checked in two steps, as shown in FIG. 20. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad (x, y) returns SAD (sum of absolute differences) value of the MVD (x, y). The MVD, denoted by (MvdX, MvdY), checked in the second step is decided as follows:

MvdX = −1;
MvdY = −1;

-continued

```
If (Sad(1, 0) < Sad(-1, 0))
    MvdX = 1;
If (Sad(0, 1) < Sad(0, -1))
    MvdY = 1;
```

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.

Early termination when SAD between list0 and list1 is zero for some position.

Block sizes for DMVR: W*H>=64 && H>=8, wherein W and H are the width and height of the block.

Split the CU into multiple of 16×16 sub-blocks for DMVR of CU size>16*16. If only width or height of the CU is larger than 16, it is only split in vertical or horizontal direction.

Reference block size (W+7)*(H+7) (for luma).

25 points SAD-based integer-pel search (i.e., (+−) 2 refinement search range, single stage).

Bilinear-interpolation based DMVR.

"Parametric error surface equation" based sub-pel refinement. This procedure is performed only when the minimum SAD cost is not equal to zero and the best MVD is (0, 0) in the last MV refinement iteration.

Luma/chroma MC with reference block padding (if needed).

Refined MVs used for MC and TMVPs only.

2.2.8.1.1 Usage of DMVR

When the following conditions are all true, DMVR may be enabled:

DMVR enabling flag in the sequence parameter set (SPS) (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.2.8.1.2 "Parametric Error Surface Equation" Based Sub-Pel Refinement

The method is summarized below:

1) The parametric error surface fit is computed only if the center position is the best cost position in a given iteration.

2) The center position cost and the costs at (−1, 0), (0, −1), (1, 0) and (0, 1) positions from the center are used to fit a two-dimensional (2-D) parabolic error surface equation of the form $$E(x, y) = A(x - x_0)^2 + B(y - y_0)^2 + C$$

where $(x_0, y_0)$ corresponds to the position with the least cost and C corresponds to the minimum cost value. By solving the 5 equations in 5 unknowns, $(x_0, y_0)$ is computed as:

$$x_0 = (E(-1, 0) - E(1, 0))/(2(E(-1, 0) + E(1, 0) - 2E(0, 0)))$$

$$y_0 = (E(0, -1) - E(0, 1))/(2((E(0, -1) + E(0, 1) - 2E(0, 0)))$$

$(x_0, y_0)$ can be computed to any required sub-pixel precision by adjusting the precision at which the division is performed (i.e., how many bits of quotient are computed). For $\frac{1}{16}^{th}$-pel accuracy, just 4 bits in the absolute value of the quotient needs to be computed, which lends itself to a fast-shifted subtraction based implementation of the 2 divisions required per CU.

3) The computed $(x_0, y_0)$ are added to the integer distance refinement MV to get the sub-pixel accurate refinement delta MV.

2.3 Intra Block Copy (IBC)

Figure 21:
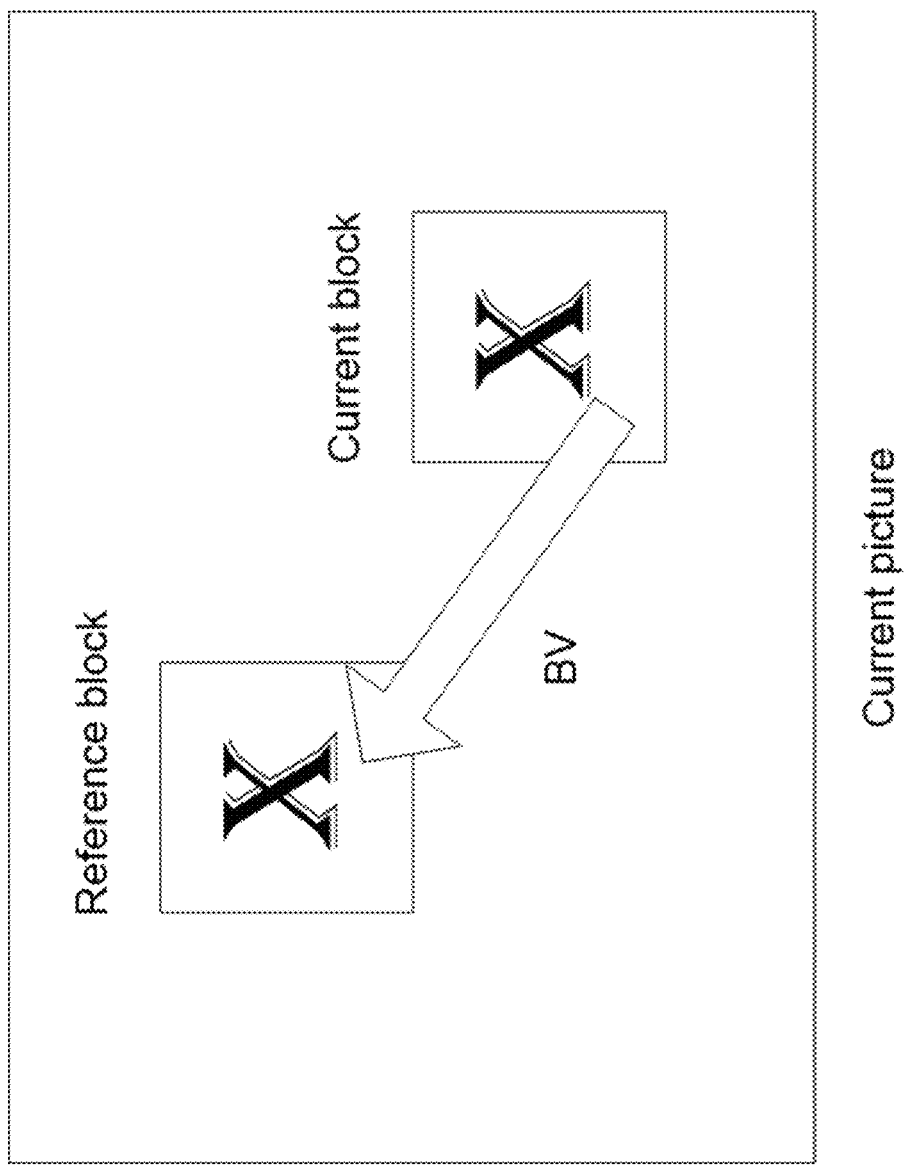
FIG. 21 shows an example of intra block copy (IBC).

Intra block copy (IBC), a.k.a., current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 21, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/three-dimensional (3D) video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g., in bitstream conformance. The other is to apply padding for those undefined pixel values. The following sub-sessions describe the solutions in detail.

2.3.1 IBC in VVC Test Model (VTM4.0)

In the current VVC test model, i.e., VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1.1 IBC Merge Mode

In IBC merge mode, an index pointing to an entry in the IBC merge candidates list is parsed from the bitstream. The construction of the IBC merge list can be summarized according to the following sequence of steps:
  Step 1: Derivation of spatial candidates
  Step 2: Insertion of HMVP candidates
  Step 3: Insertion of pairwise average candidates In the derivation of spatial merge candidates, a maximum of four merge candidates are selected among candidates located in the positions depicted in A1, B1, B0, A0 and B2 as depicted in FIG. 2. The order of derivation is A1, B1, B0, A0 and B2. Position B2 is considered only when any PU of position A1, B1, B0, A0 is not available (e.g., because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.1.2 IBC AMVP Mode

In IBC AMVP mode, an AMVP index point to an entry in the IBC AMVP list is parsed from the bitstream. The construction of the IBC AMVP list can be summarized according to the following sequence of steps:
  Step 1: Derivation of spatial candidates
    Check A0, A1 until an available candidate is found.
    Check B0, B1, B2 until an available candidate is found.
  Step 2: Insertion of HMVP candidates
  Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into (N>>1)*(M>>1) sub blocks.
2) Each sub block with a top left sample coordinated at (x, y) fetches the corresponding luma block covering the same top-left sample which is coordinated at (2x, 2y).
3) The encoder checks the block vector (bv) of the fetched luma block. If one of the following conditions is satisfied, the bv is considered as invalid.
   a. A bv of the corresponding luma block is not existing.
   b. The prediction block identified by a bv is not reconstructed yet.
   c. The prediction block identified by a bv is partially or fully overlapped with the current block.
4) The chroma motion vector of a sub block is set to the motion vector of the corresponding luma sub block.

The IBC mode is allowed at the encoder when all sub blocks find a valid bv.

2.3.2 Recent Progress for IBC (in VTM5.0)

2.3.2.1 Single BV List

JVET-N0843 is adopted to the VVC. In the JVET-N0843, the BV predictors for merge mode and AMVP mode in IBC will share a common predictor list, which consist of the following elements:
  2 spatial neighboring positions (A1, B1 as in FIG. 2)
  5 HMVP entries
  Zero vectors by default The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

2.3.2.2 Updating of IBC HMVP Table

Similar to the design of updating process for HMVP table used for inter mode coding, pruning is applied and a counter is maintained to record number of available IBC candidates in the IBC HMVP table.

The related specification is defined as follows:

8.6.2.6 Updating Process for the History-Based Motion Vector Predictor Candidate List Inputs to this process are:
  luma motion vector mvL in 1/16 fractional-sample accuracy.

The candidate list HmvpIbcCandList is modified by the following ordered steps:
1. The variable identicalCandExist is set equal to FALSE and the variable removeIdx is set equal to 0.
2. When NumHmvpIbcCand is greater than 0, for each index hMvpIdx with hMvpIdx=0 . . . . NumHmvpIbcCand−1, the following steps apply until identicalCandExist is equal to TRUE:
   When hMvpCand is equal to HmvpIbcCandList[hMvpIdx], identicalCandExist is set equal to TRUE and removeIdx is set equal to hMvpIdx.

3. The candidate list HmvpIbcCandList is updated as follows:
   If identicalCandExist is equal to TRUE or NumHmvpIbcCand is equal to MaxNumMergeCand−1, the following applies:
      For each index i with i=(removeIdx+1) . . . (NumHmvpIbcCand−1), HmvpIbcCandList[i−1] is set equal to HmvpIbcCandList[i].
      HmvpIbcCandList[NumHmvpIbcCand−1] is set equal to mvCand.
   Otherwise (identicalCandExist is equal to FALSE and NumHmvpIbcCand is less than MaxNumMergeCand−1), the following applies:
      HmvpIbcCandList[NumHmvpIbcCand++] is set equal to mvCand.
   Here, MaxNumMergeCand is set to 6.

2.4 Switchable Interpolation Filter 2.4.1 Half-Pel AMVR Mode

An additional AMVR mode for non-affine non-merge inter-coded CUs is proposed which allows signaling of motion vector differences at half-pel accuracy. The existing AMVR scheme of the current VVC draft is extended straightforward in the following way: Directly following the syntax element amvr_flag, if amvr_flag==1, there is a new context-modeled binary syntax element hpel_amvr_flag which indicates usage of the new half-pel AMVR mode if hpel_amvr_flag==1. Otherwise, i.e., if hpel_amvr_flag==0, the selection between full-pel and 4-pel AMVR mode is indicated by the syntax element amvr_precision_flag as in the current VVC draft.

The AMVR signalling is extended as shown in Tables in FIG. 24.

Figure 25:
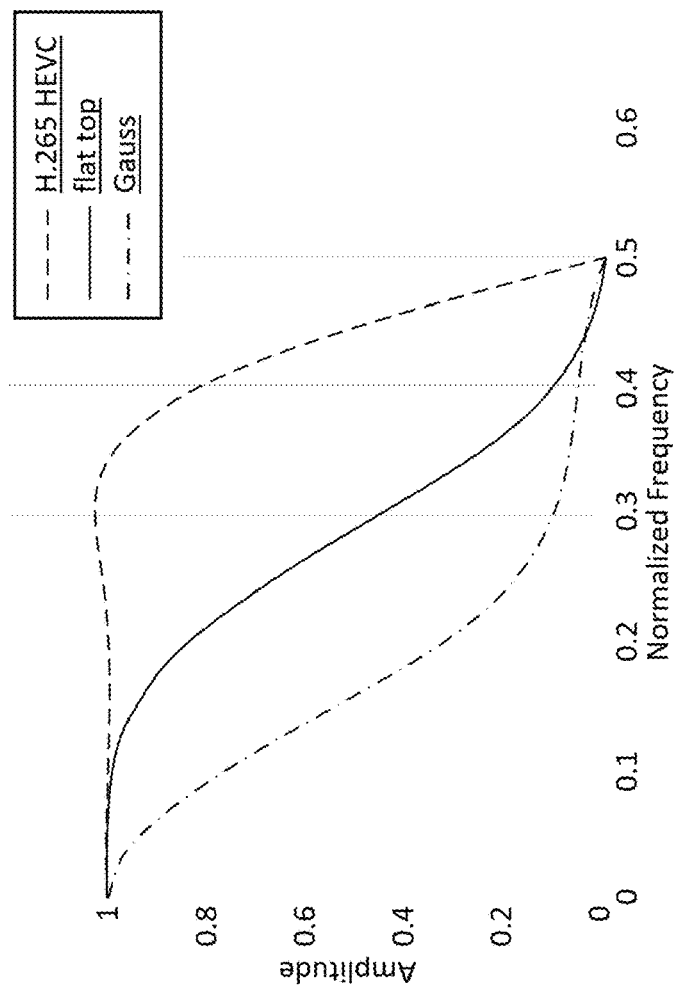
FIG. 25 shows examples of interpolation filters used in video coding or decoding.

In JVET-N0309, alternative luma half-pel interpolation filters are proposed where two 6-tap filters with smoothing characteristics, denoted as FlatTop and Gauss, are tested in CE4-1. See FIG. 25.

2.4.2 Explicit Signalling

For a non-affine and non-merge inter-coded CU which uses half-pel motion vector accuracy (i.e., the half-pel AMVR mode), an alternative luma half-pel interpolation filter is used. For test described in 2.4.1, The Gauss luma half-pel interpolation filter is used. For this test, a switching between the two alternative half-pel interpolation filters is made based on the value of a new syntax element hpel_if_idx. The syntax element hpel_if_idx is only signaled in case of half-pel AMVR mode as follows:

| AMVR mode | hpel_if_idx | Interpolation filter |
| --- | --- | --- |
| QPEL (1/4-pel), FPEL (1-pel), 4PEL (4-pel) | not present (inferred to 2) | HEVC |
| HPEL | 0 | FlatTop |
| HPEL | 1 | Gauss |

2.4.3 Implicit Signalling

In case of skip/merge mode using a spatial merging candidate, the information which interpolation filter is applied for the half-pel position is inherited from the neighboring block.

3. Examples of Problems Solved by Disclosed Embodiments

The current HMVP design must record the number of available HMVP candidates in a HMVP table. For the HMVP table utilized for inter-coded blocks and IBC HMVP table utilized for IBC-coded blocks, two different counters are maintained. Whenever a HMVP table needs to be updated, the counter needs to be checked and modified accordingly.

4. Example Embodiments

The listing below should be considered as examples to explain general concepts. These embodiments should not be interpreted in a narrow way. Furthermore, these inventions can be combined in any manner.

The look-up table (LUT)-based motion vector prediction based on the disclosed embodiments, which may enhance both existing and future video coding standards, is elucidated in the following examples described for various implementations. In the LUT-based motion vector prediction method, one or multiple tables with motion information from previously coded blocks are maintained during the encoding/decoding process. During the encoding/decoding of one block, the associated motion information in LUTs may be added to the motion candidate lists, and after encoding/decoding one block, LUTs may be updated. The LUT-based method is also referred as history-based motion vector prediction (HMVP) method. The motion information includes at least one of: a prediction direction, a reference picture index, motion vector values, intensity compensation flag, affine flag, motion vector difference precision, or motion vector difference value. The motion candidates may also include other kinds of coded information, such as intra prediction modes for intra mode coding; illumination compensation parameters for IC parameter coding; and filter parameters.

Before coding a video unit (e.g., slice/tile/brick/picture/CTU row/CTU), a HMVP table may be reset by filling one or multiple default motion candidates instead of resetting the counter of available HMVP candidates in the table to 0. Denote a HMVP table size by N, i.e., up to N HMVP candidates may be stored.

In the following discussion, the term "slice" may also be referred as "tile group" or "tile/brick/CTU row" or other video data units.

1. Whenever a HMVP table is reset, K (K<=N) default HMVP candidates may be utilized to fill in the HMVP table.
   a. In one example, K default HMVP candidates are the same.
      i. Alternatively, at least two of the K default HMVP candidates are different.
      ii. Alternatively, one default HMVP candidate may be added multiple times to the HMVP table.
         1) Alternatively, the first m (m<K) default HMVP candidates may be different from each other, however the remaining last (K−m) candidates are identical to one of the first m candidates.
         2) Alternatively, the last m (m<K) default HMVP candidates may be different from each other, however the remaining first (K−m) candidates are identical to one of the first m candidates.
      iii. Alternatively, the first m (m<K) default HMVP candidates may be different from each other, however the remaining last (K-m) candidates are filled by copying the first m candidates repeatedly.
   b. In one example, a default HMVP candidate may be set as a uni-prediction motion candidate.
      i. In one example, for a P slice/picture, the prediction direction may be set to list 0.

ii. In one example, for a B slice/picture, the prediction direction may be set to list 0 or list 1.
iii. Alternatively, furthermore, the motion vector (MV) of the default HMVP candidate may be set to be (0, 0).
iv. Alternatively, furthermore, the MV of the default HMVP candidate may be set to be (−m*W, 0) wherein m and W are two integers. For example, W is one of allowed width for a coding unit/prediction unit/transform unit.
v. Alternatively, furthermore, the MV of the default HMVP candidate may be set to be (0, −q*H) wherein q and H are two integers. For example, H is one of allowed height for a coding unit/prediction unit/transform unit.
vi. Alternatively, furthermore, the MV of the default HMVP candidate may be set to be (−m*W, −q*H), wherein m, W, q, H are integers. For example, W and H are one of allowed width and height for a coding unit/prediction unit/transform unit, respectively.
vii. Alternatively, furthermore, the reference index of the default HMVP candidate may be set to any value smaller than the number of reference pictures in the prediction direction (i.e., list 0 or 1).
viii. Alternatively, furthermore, the reference picture may be set to the current picture.
ix. Alternatively, furthermore, IBC flag may be set to 1.
c. In one example, a default HMVP candidate may be set as a Bi-prediction motion candidate.
  i. In one example, the motion information associated with each prediction direction may be set using the bullets under 1.ii.
  ii. Alternatively, furthermore, the weighting factors for the two predictions from the two directions may be set to equal for the two MVs.
    1) In one example, Generalized Bi-Prediction (GBI) index is set to 0.
d. A default HMVP candidate may include the motion information from another video unit, such as another CTU row/another picture.
e. In one example, for P slices/pictures, the default HMVP candidates may include (Mv(0,0), i) wherein i is a reference picture index which is in the range of [0, number of reference pictures in list 0 minus 1].
  i. Alternatively, furthermore, the candidates may be added to the HMVP table in the ascending/descending order of i.
  ii. Alternatively, furthermore, if number of reference pictures in list 0 is smaller than K, one of the default motion candidates may be added repeatedly until K candidates are available.
f. Alternatively, furthermore, if number of reference pictures in list 0 is smaller than K, the available default HMVP candidates may be added repeatedly until K candidates are available. In one example, for B slices/pictures, the default HMVP candidates may include K0 uni-prediction HMVP candidates from list X, K1 uni-prediction HMVP candidates from list Y (Y is equal to (1−X)) and K2 Bi-prediction HMVP candidates wherein (K0+K1+K2=K, and K0/K1/K2>=0).
  i. In one example, for B slices/pictures, the default HMVP candidates may only include Bi-prediction HMVP candidates.
  ii. In one example, for B slices/pictures, the default HMVP candidates may include uni- and Bi-prediction HMVP candidates in an interleaved way.
  iii. In one example, for B slices/pictures, the default HMVP candidates may include uni-prediction HMVP candidates, followed by and Bi-prediction HMVP candidates.
g. Alternatively, furthermore, when K is equal to N, the counter which is maintained to record the number of available HMVP candidates in the table is removed.
h. In one example, a default HMVP candidate can only refer to the reference pictures with reference index equal to a specific value (e.g., 0).
2. Default HMVP candidates may be adaptively changed from one video unit to another one.
  a. Default HMVP candidates may be adaptively changed from one CTU row to another CTU row.
  b. Default HMVP candidates may be adaptively changed from one tile to another tile.
3. Default HMVP candidates may be different for different HMVP tables.
  a. In one example, selection of default HMVP candidates may depend on the HMVP table used for a coded mode.
    i. In one example, default HMVP candidates used for filling in the HMVP table for inter-coded blocks and IBC coded blocks may be different.
4. When N default HMVP candidates are filled in a HMVP table before encoding/decoding a video unit, the following may further apply when adding a new motion candidate.
  a. In one example, the new motion candidate is compared to the available HMVP candidates according to ascending or descending order of index of HMVP candidates in the HMVP table.
    i. In one example, the comparison process is terminated when an identical HMVP candidate is found. Alternatively, furthermore, the identical HMVP candidate is removed from the table, and the new motion candidate is added to the last entry of the table.
    ii. In one example, the comparison process is terminated after checking all HMVP candidates in the table. Alternatively, furthermore, all the identical M HMVP candidates is removed from the table, and the new motion candidate is added repeatedly until the table is full.
5. Default HMVP candidates may be signaled in video parameter set (VPS)/decoding parameter set (DPS)/SPS/adaptation parameter set (APS)/picture parameter set (PPS)/picture header/Slice header/tile group header.
  a. Alternatively, multiple sets of default HMVP candidates may be predefined, and one or multiple indices may be signaled to indicate which set of HMVP candidates is used by a picture/slice/tile group/tile/CTU row.
  b. Alternatively, multiple sets of default HMVP candidates may be predefined, and an index for one coding mode (e.g., IBC or non-IBC) may be signaled to indicate which set of HMVP candidates is used by a picture/slice/tile group/tile/CTU row.
6. When updating a HMVP table/HMVP list, the new motion candidate to be added may be added before all existing motion candidates in the HMVP table/HMVP list. In this case, an entry index to the table with smallest value may indicate the latest motion candidate in the decoding order.

a. In one example, the new motion candidate may not be added if it is identical or similar to an existing candidate in the table.
   i. Alternatively, the new motion candidate may not be added if it is identical or similar to an existing candidate (e.g., MV difference is smaller than a threshold) in the table, and the identical or similar to an existing candidate is removed from the table.
7. The above-mentioned methods may be applied to all HMVP tables (e.g., including those to be used by inter or IBC coded blocks).
   a. Alternatively, which HMVP table that above-mentioned methods should be applied to may depend on the usage of the table, such as used for IBC coded block or not.
8. The proposed methods may be applicable to other coding information with history information, such as history-based intra mode coding method with the LUT filled by default intra prediction modes.

Storage of Motion Information in HMVP Table/HMVP List

9. Indications of the interpolation filter used for a block and/or side information of switchable interpolation filter may be stored in the motion candidate stored in the HMVP table/HMVP list.
   a. In one example, a motion candidate comprises the indications of the interpolation filter used for a block are stored together with other motion information, such as MVs, reference picture indices, Generalized Bi-Prediction (GBi)/Bi-prediction with CU weights (BCW) index, etc. al.
   b. In one example, two motion candidates with different interpolation filters may be considered as different motion candidates.
   c. In one example, two motion candidates with different interpolation filters may be considered as same motion candidates. For example, for a motion candidate X in the HMVP table, if a motion candidate Y has identical information to X except the interpolation filter, then X may be removed from the HMVP table and Y may be inserted into the HMVP table.
   d. In one example, whether to store the indication of the interpolation filter for a motion candidate in the HMVP table may depend on the MV resolution of the motion candidate.
      i. For example, the indication of the interpolation filter for a motion candidate in the HMVP table may be stored if the MV of the candidate is with the half-pel resolution.
      ii. In one example, the interpolation filter may be stored for each prediction direction.

Usage of Motion Information in HMVP Table/HMVP List

10. During the pruning process (e.g., comparing and/or refraining from adding a new candidate) of a new candidate to an existing candidate in the candidate list, the interpolation filter information shall also be compared.
    e. In one example, suppose there are two candidates with same motion information excluding the interpolation filters associated with the two candidates, they are treated to be different. In this case, the new candidate may also be added to the candidate list.
11. When adding a motion (HMVP) candidate in the HMVP table/HMVP list to a list (e.g., AMVP or merge list) as a new (e.g., AMVR or merge) candidate, the interpolation filter associated with the motion candidate may also be inherited by the new candidate.
    f. In one example, in the pruning process, the interpolation filter information may also be considered.
12. Multiple new candidates may be derived based on one motion (HMVP) candidate in the HMVP table/HMVP list to a list (e.g., AMVP or merge list), and each one may be associated with different interpolation filter.

Figure 22:
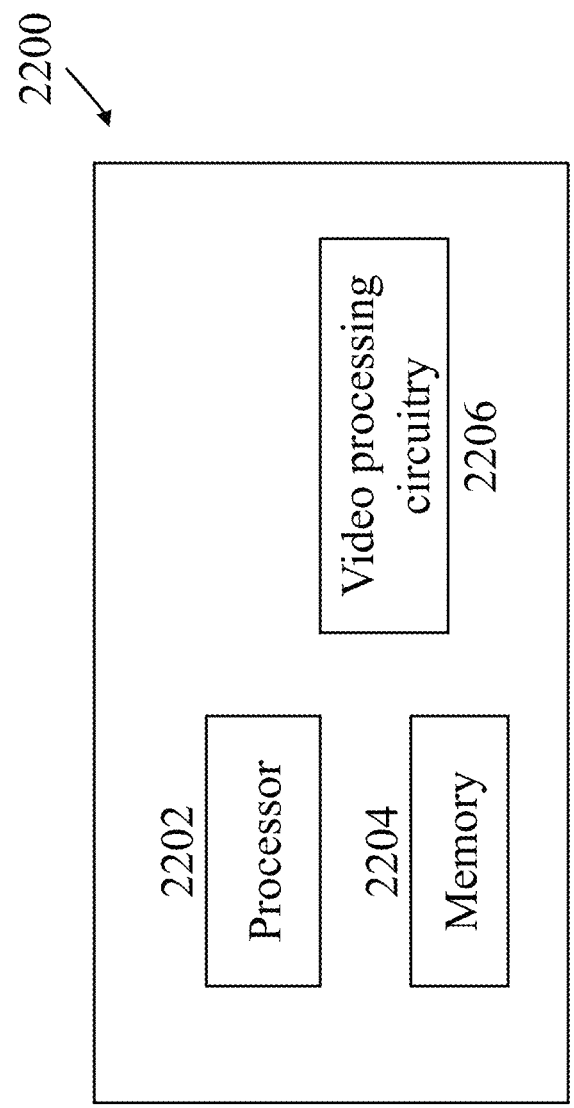
FIG. 22 is a block diagram of an example of a hardware platform used for implementing embodiments described in the present disclosure.

FIG. 22 is a block diagram of a video processing apparatus 2200. The apparatus 2200 may be used to implement one or more of the methods described herein. The apparatus 2200 may be embodied in a smartphone, tablet, computer, Internet of Things (IoT) receiver, and so on. The apparatus 2200 may include one or more processors 2202, one or more memories 2204 and video processing hardware 2206. The processor(s) 2202 may be configured to implement one or more methods described in the present disclosure. The memory (memories) 2204 may be used for storing data and code used for implementing the methods and embodiments described herein. The video processing hardware 2206 may be used to implement, in hardware circuitry, some embodiments described in the present disclosure.

Figure 23:
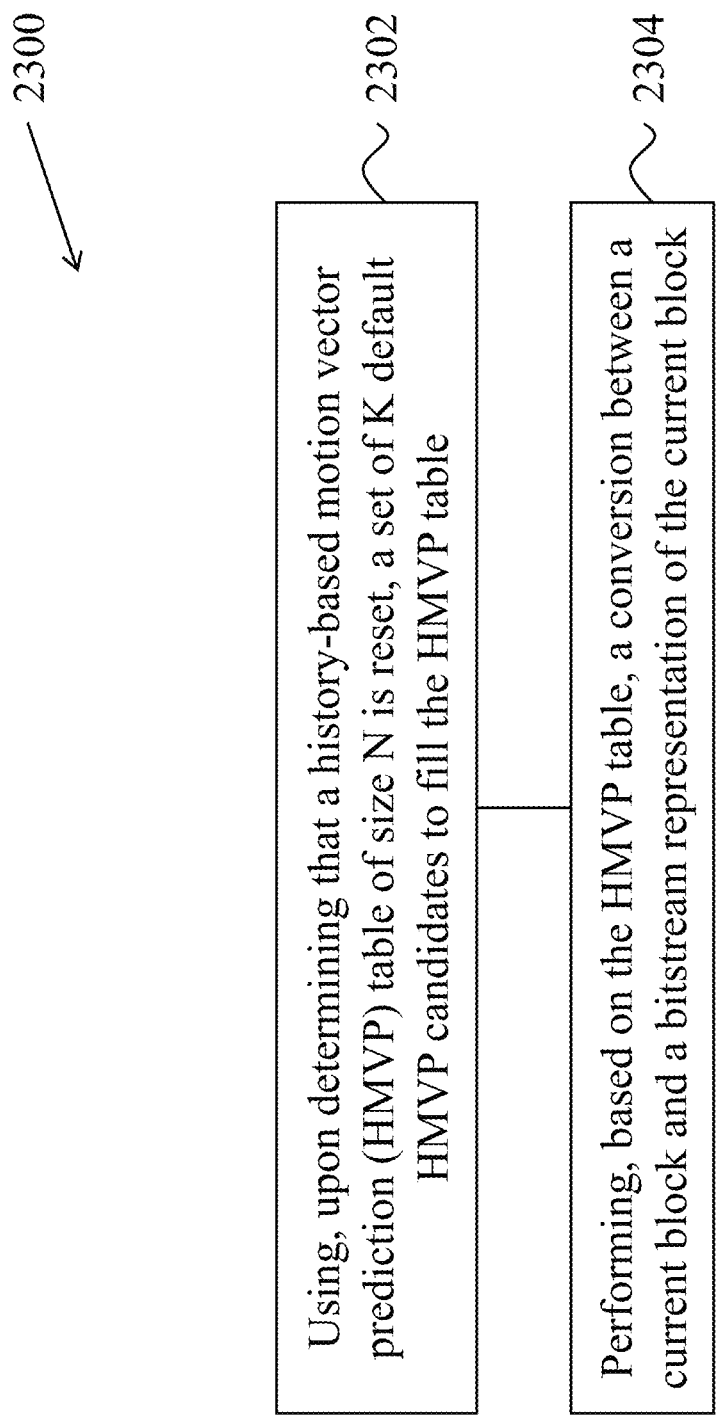
FIG. 23 is a flowchart for an example method of video processing.

FIG. 23 is a flowchart for an example method 2300 for video processing. The method 2300 includes using (2302), upon determining that a history-based motion vector prediction (HMVP) table of size N is reset, a set of K default HMVP candidates to fill the HMVP table, where N and K are positive integers and K≤N, and performing (2304), based on the HMVP table, a conversion between a current block and a bitstream representation of the current block.

Some embodiments may preferably include the following examples.

1. A method for video processing, comprising: using, upon determining that a history-based motion vector prediction (HMVP) table of size N is reset, a set of K default HMVP candidates to fill the HMVP table, wherein N and K are positive integers, and wherein K≤N; and performing, based on the HMVP table, a conversion between a current block and a bitstream representation of the current block.
2. The method of example 1, wherein each of the set of K default HMVP candidates are identical.
3. The method of example 1, wherein at least two of the set of K default HMVP candidates are different.
4. The method of example 1, wherein at least one of the set of K default HMVP candidates is added multiple times into the HMVP table.
5. The method of example 4, wherein each of a first m candidates in the HMVP table is different, and wherein each of a last (K-m) candidates in the HMVP table is identical to one of the first m candidates, and wherein m is a positive integer.
6. The method of example 4, wherein each of a last (K-m) candidates in the HMVP table is different, and wherein each of a first m candidates in the HMVP table is identical to one of the last (K-m) candidates, and wherein m is a positive integer.
7. The method of example 4, wherein each of a first m candidates in the HMVP table is different, and wherein a last (K-m) candidates in the HMVP table comprise one or more copies of the first m candidates.
8. The method of example 1, wherein at least one of the set of K default HMVP candidates is a uni-prediction motion candidate.
9. The method of example 8, wherein a slice or picture comprising the current block is a P slice or picture, respectively, and wherein a prediction direction of the uni-prediction motion candidate is set to list 0 (L0).

10. The method of example 8, wherein a slice or picture comprising the current block is a B slice or picture, respectively, and wherein a prediction direction of the uni-prediction motion candidate is set to list 0 (L0) or list 1 (L1).
11. The method of example 8, wherein a motion vector of the uni-prediction motion candidate is set to (0, 0).
12. The method of example 8, wherein a motion vector of the uni-prediction motion candidate is set to (−m×W, 0), wherein m and W are integers.
13. The method of example 8, wherein a motion vector of the uni-prediction motion candidate is set to (0, −q×H), wherein q and H are integers.
14. The method of example 8, wherein a motion vector of the uni-prediction motion candidate is set to (−m×W, −q×H), wherein m, q, H and W are integers.
15. The method of example 12 or 14, wherein W is an allowed width for a prediction unit (PU), coding unit (CU) or transform unit (TU) associated with the current block.
16. The method of example 13 or 14, wherein H is an allowed height for a prediction unit (PU), coding unit (CU) or transform unit (TU) associated with the current block.
17. The method of example 1, wherein at least one of the set of K default HMVP candidates is a bi-prediction motion candidate.
18. The method of example 1, wherein at least one of the set of K default HMVP candidates comprises motion information from a video unit different from a video unit comprising the current block.
19. The method of example 18, wherein the video unit comprises a coding tree unit (CTU) row or a picture.
20. A method for video processing, comprising: determining, for a conversion between a current block and a bitstream representation of the current block, a set of default history-based motion vector prediction (HMVP) candidates to use during the conversion; and performing the conversion using the set of default HMVP candidates, wherein different HMVP candidates are used during conversion of different video units.
21. The method of example 20, wherein the different video units comprise different coding tree unit (CTU) rows or different tiles.
22. A method for video processing, comprising: determining, prior to a conversion between a current block and a bitstream representation of the current block, that a set of N default history-based motion vector prediction (HMVP) candidates have been filled in an HMVP table; adding a motion candidate to the HMVP table; and performing, using the HMVP table comprising the motion candidate, the conversion.
23. The method of example 22, further comprising: comparing, based on an ascending or a descending order of indexes of the set of N default HMVP candidates, the motion candidate to each candidate in the HMVP table.
24. The method of example 23, wherein the comparing is terminated when the motion candidate matches a particular candidate in the HMVP table.
25. The method of example 24, wherein the particular candidate is removed from the HMVP table, and wherein the motion candidate is added to a last entry of the HMVP table.
26. The method of any of examples 1 to 25, wherein the set of default HMVP candidates is signaled in a video parameter set (VPS), a decoder parameter set (DPS), a sequence parameter set (SPS), an adaptation parameter set (APS), a picture parameter set (PPS), a picture header, a slice header or a tile group header.
27. The method of any of examples 1 to 25, wherein multiple sets of default HMVP candidates are pre-defined, and wherein an index of the set of default HMVP candidates within the multiple sets of default HMVP candidates is signaled.
28. The method of any of examples 1 to 27, wherein the current block is coded using an inter coded mode or an intra block copy (IBC) mode.
29. A method of video processing, comprising: storing, prior to a conversion between a current video block and a bitstream representation of the current video block, information for an interpolation filter used for the current video block or side information about a switchable interpolation filter used for the current video block, along with past motion information for the current video block in a table; performing the conversion based on entries of the table; and updating the table after the conversion is performed.
30. The method of example 29, wherein the past motion information includes motion candidate that includes the information for the interpolation filter or the side information and at least one of a motion vector, a reference picture index, a generalized bi-prediction information, a bi-prediction weight index.
31. The method of any of examples 29-30, wherein the updating includes updating based on the information for the interpolation filter.
32. The method of any of examples 29-31, wherein the updating includes updating based on the side information.
33. The method of examples 31-32 wherein the information for the interpolation filter or the side information is used to determine uniqueness of corresponding motion candidate.
34. The method of any of examples 29-33, wherein the updating is based on a pruning process in which a new motion candidate is compared with stored information in the table and selectively added based on unique information contained in the new motion candidate.
35. The method of example 34, wherein the pruning process determines uniqueness based on the information for interpolation filter.
36. The method of any of examples 29 to 35, wherein the updating includes updating the table using motion candidate from an advanced motion vector resolution list or a merge candidate along with corresponding interpolation filter information or side information.
37. The method of any of examples 29 to 35, wherein the updating includes generating new candidates by deriving from other candidates having different interpolation information or different side information.
38. The method of any of examples 29 to 37, wherein the conversion includes an encoding process of generating the bitstream representation from the current video block.
39. The method of any of examples 29 to 37, wherein the conversion includes a decoding process of generating the current video block from the bitstream representation.

Items 9-12 in the previous section provide additional aspects and variations related to examples 29 to 39.

40. An apparatus in a video system comprising a processor and a non-transitory memory with instructions thereon, wherein the instructions upon execution by the processor, cause the processor to implement the method in any one of examples 1 to 39.

41. A computer program product stored on a non-transitory computer readable media, the computer program product including program code for carrying out the method in any one of examples 1 to 39.

In the listing of examples in this present disclosure, the term conversion may refer to the generation of the bitstream representation for the current video block or generating the current video block from the bitstream representation. The bitstream representation need not represent a contiguous group of bits and may be divided into bits that are included in header fields or in codewords representing coded pixel value information.

It will be appreciated that the disclosed embodiments may be embodied in video encoders or decoders to improve compression efficiency using embodiments that include the use of various implementation rules of considerations regarding the use history-based motion vector prediction (HMVP) with default parameters, as described in the present disclosure.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 26:
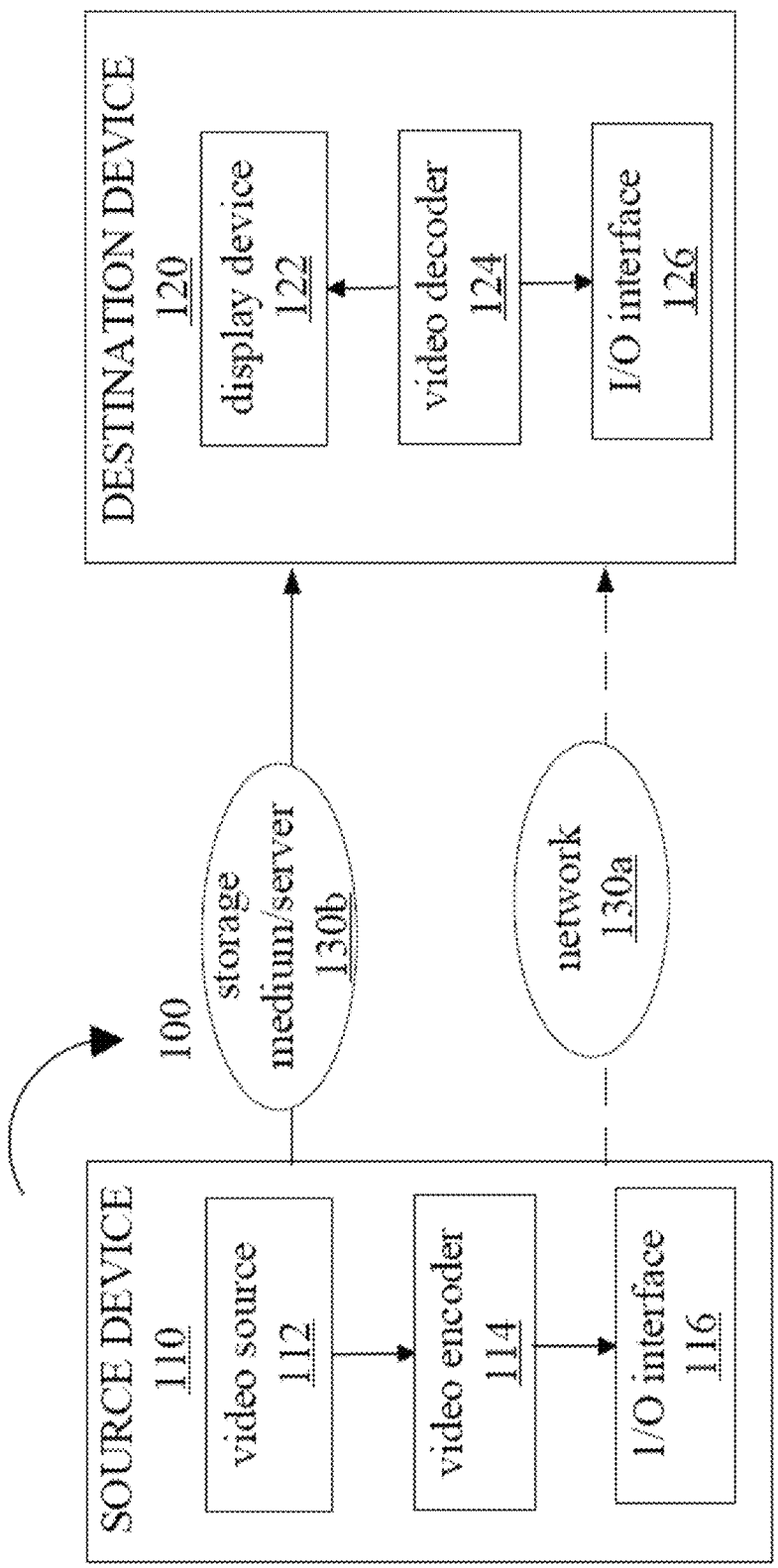
FIG. 26 is a block diagram that illustrates an example video coding system that may implement embodiments of the present disclosure.

FIG. 26 is a block diagram that illustrates an example video coding system 100 that may utilize the embodiments of this disclosure. As shown in FIG. 26, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard, and other current and/or further standards.

Figure 27:
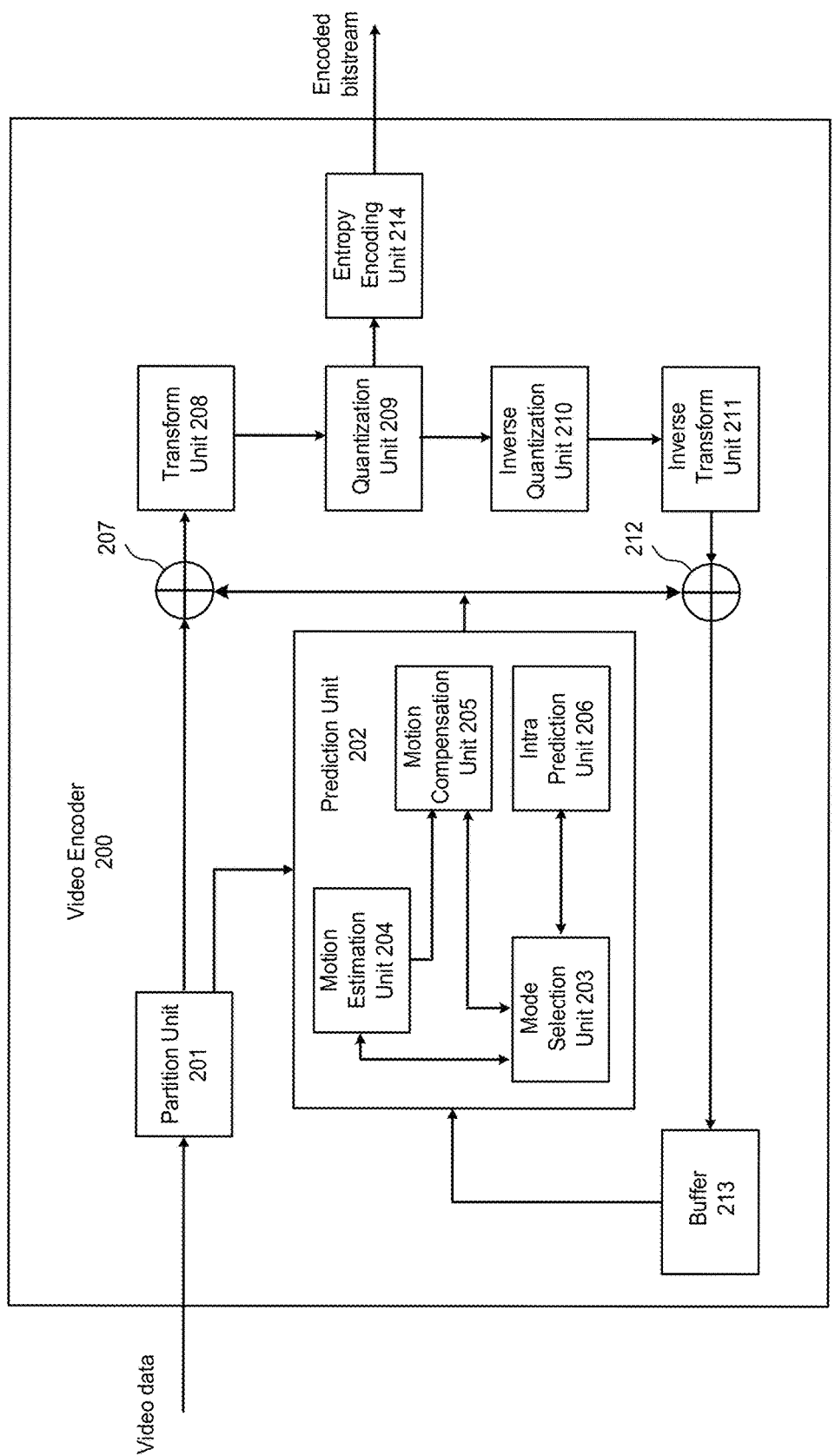
FIG. 27 is a block diagram illustrating an example of video encoder.

FIG. 27 is a block diagram illustrating an example of video encoder 200, which may be video encoder 114 in the system 100 illustrated in FIG. 26.

Video encoder 200 may be configured to perform any or all of the embodiments of this disclosure. In the example of FIG. 27, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201; a prediction unit 202, which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 27 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP)

mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 28:
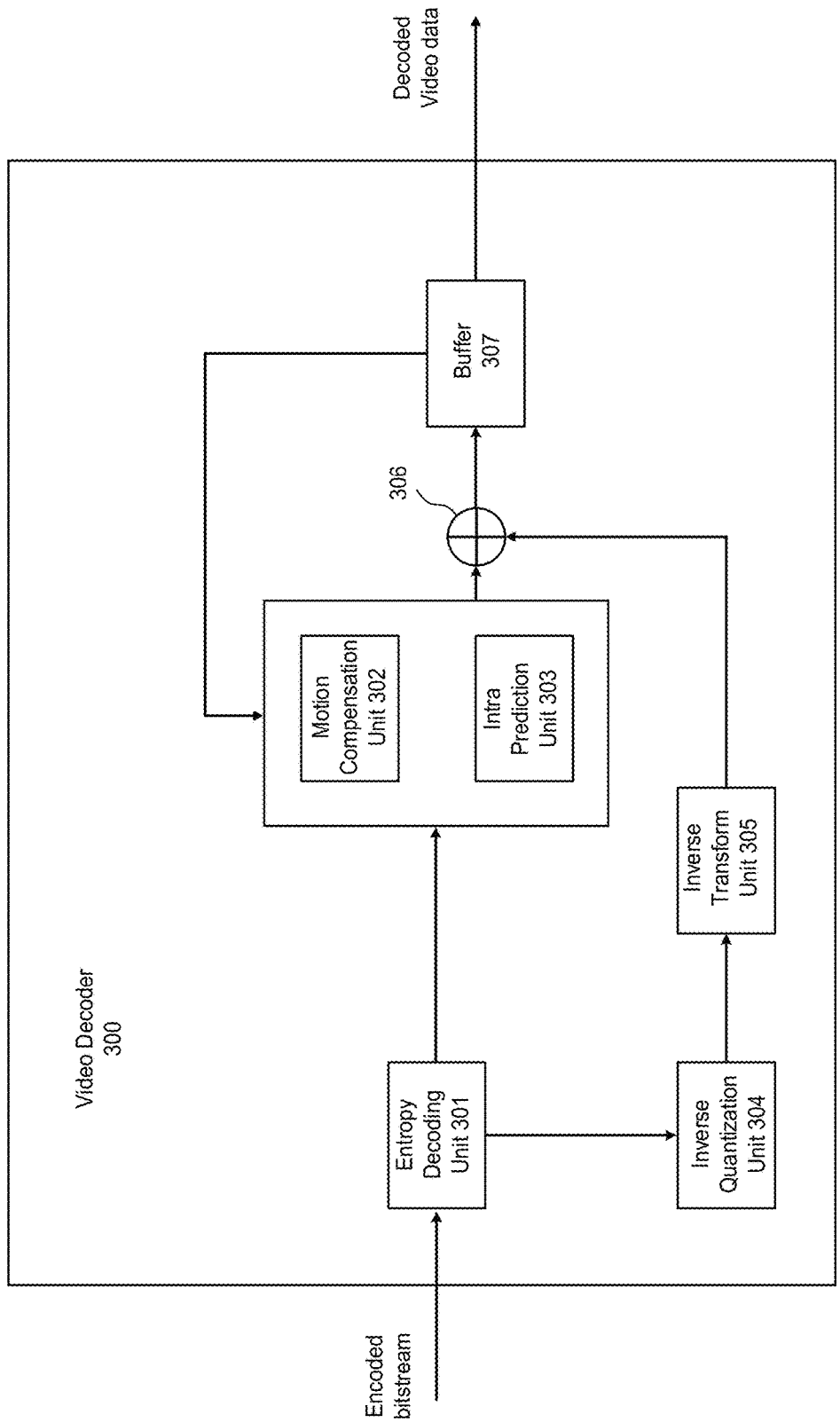
FIG. 28 is a block diagram illustrating an example of video decoder.

FIG. 28 is a block diagram illustrating an example of video decoder 300 which may be video decoder 124 in the system 100 illustrated in FIG. 26.

The video decoder 300 may be configured to perform any or all of the embodiments of this disclosure. In the example of FIG. 28, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 28, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 27).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 204 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation, or coded representation, of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Figure 29:
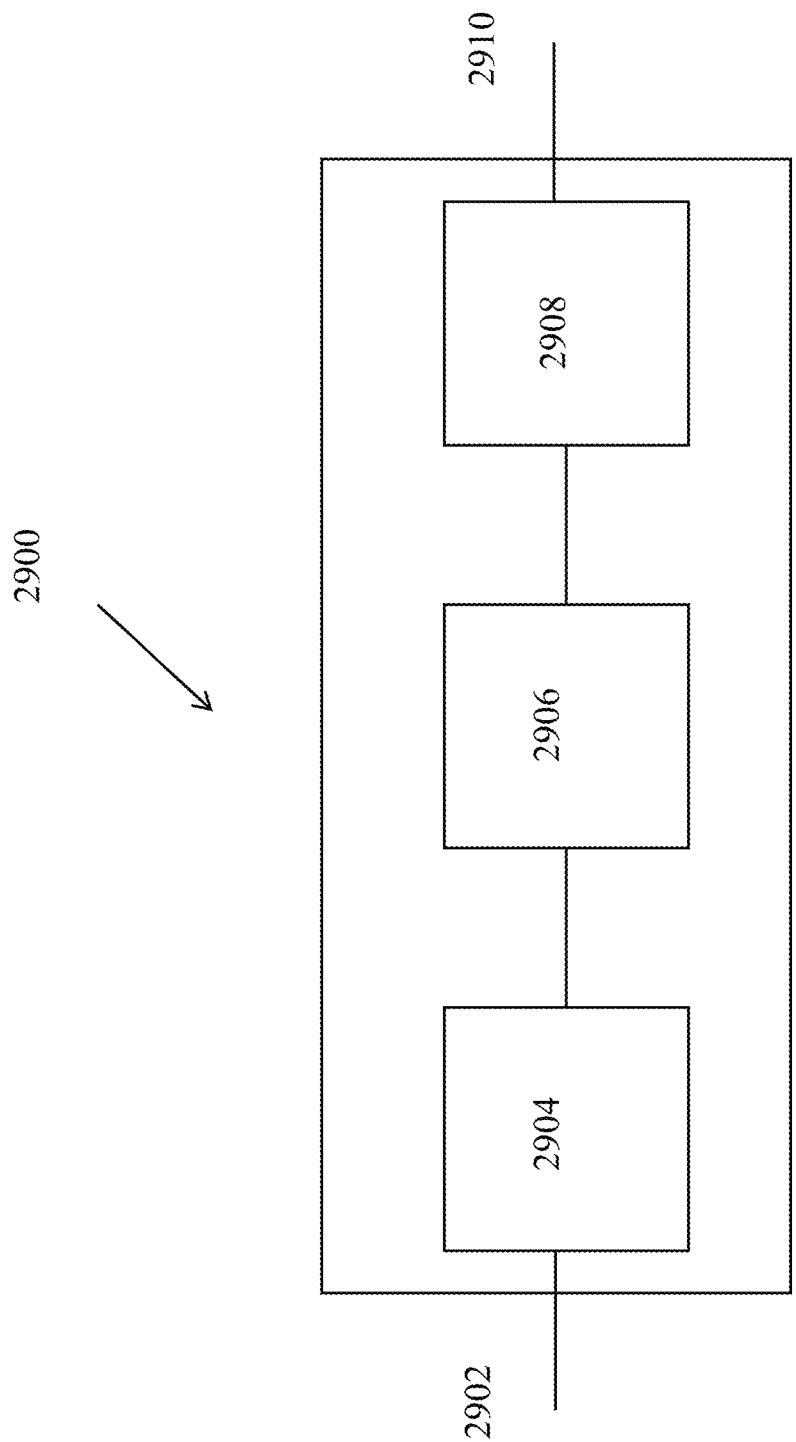
FIG. 29 is a block diagram showing an example video processing system in which various embodiments disclosed herein may be implemented.

FIG. 29 is a block diagram showing an example video processing system 2900 in which various embodiments disclosed herein may be implemented. Various implementations may include some or all of the components of the system 2900. The system 2900 may include input 2902 for receiving video content. The video content may be received in a raw or uncompressed format, e.g., 8- or 10-bit multi-component pixel values, or may be in a compressed or encoded format. The input 2902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2900 may include a coding component 2904 that may implement the various coding or encoding methods described in the present disclosure. The coding component 2904 may reduce the average bitrate of video from the input 2902 to the output of the coding component 2904 to produce a coded representation of the video. The coding techniques are therefore sometimes called video compression or video transcoding techniques. The output of the coding component 2904 may be either stored, or transmitted via a communication connected, as represented by the component 2906. The stored or communicated bitstream (or coded) representation of the video received at the input 2902 may be used by the component 2908 for generating pixel values or displayable video that is sent to a display interface 2910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 30:
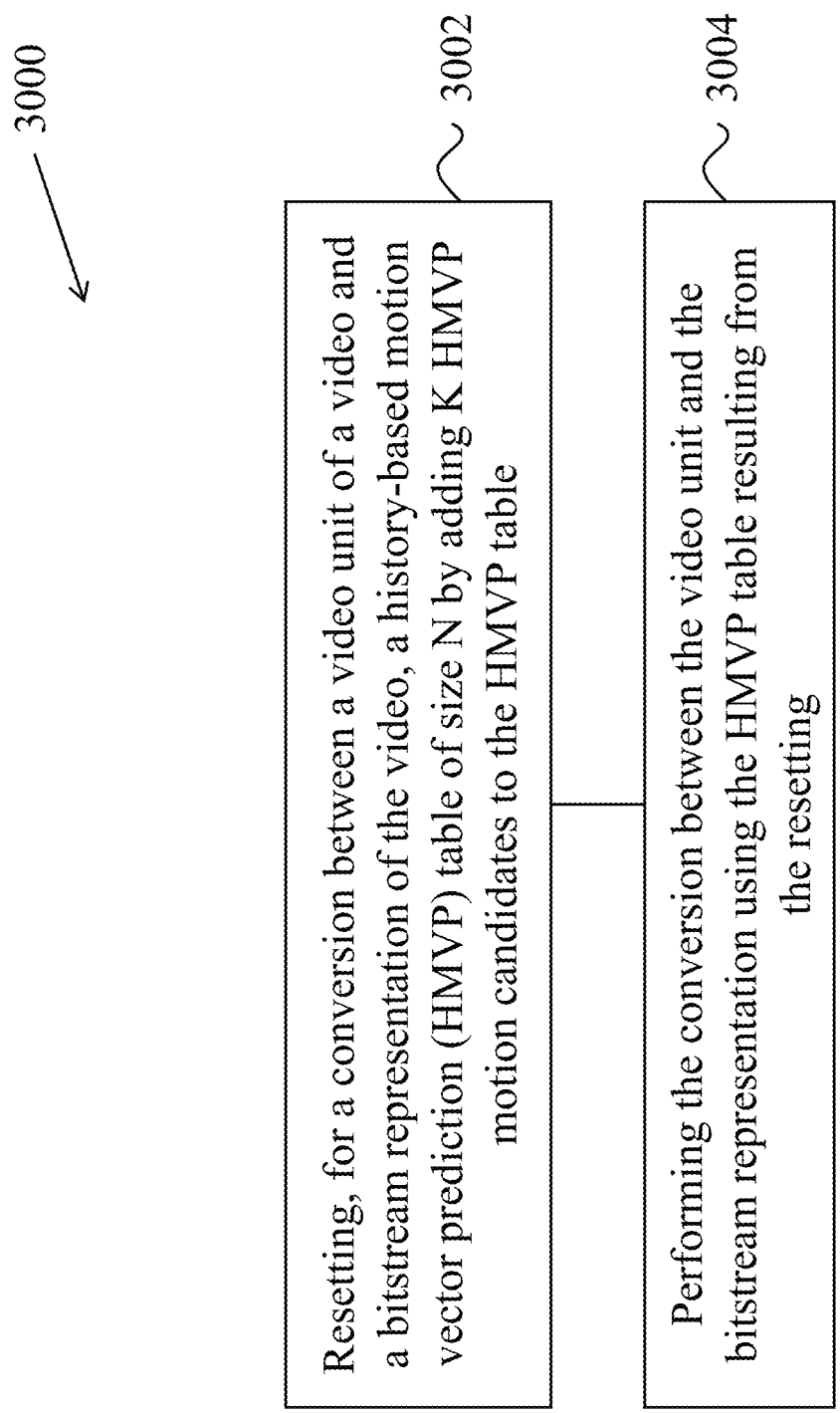
FIGS. 30 and 31 show flowcharts for example methods of video processing.

FIG. 30 is a flowchart for an example method 3000 for video processing. The method 3000 includes resetting 3002, for a conversion between a video unit of a video and a bitstream representation of the video, a history-based motion vector prediction (HMVP) table of size N by adding K HMVP motion candidates to the HMVP table, wherein the K HMVP motion candidates have default values, wherein N and K are positive integers, and wherein K≤N; and performing 3004 the conversion between the video unit and the bitstream representation using the HMVP table resulting from the resetting.

In some embodiments for method 3000, each of the K HMVP motion candidates are identical. In some embodiments for method 3000, at least two of the K HMVP motion candidates are different. In some embodiments for method 3000, at least one motion candidate with a default value is added multiple times into the HMVP table. In some embodiments for method 3000, a first m candidates in the HMVP table are different from each other, each of a last (K-m) candidates in the HMVP table is identical to one of the first m candidates, and m<K. In some embodiments for method 3000, a last (K−m) candidates in the HMVP table are different from each other, each of a first m candidates in the HMVP table is identical to one of the last (K−m) candidates, and m<K. In some embodiments for method 3000, a first m candidates in the HMVP table are different from each other, a last (K−m) candidates in the HMVP table comprise one or more copies of the first m candidates, and m<K.

In some embodiments for method 3000, at least one of the K HMVP motion candidates is a uni-prediction motion candidate. In some embodiments for method 3000, the video unit is a P slice or P picture, and wherein a prediction direction of the uni-prediction motion candidate is set to list 0 (L0). In some embodiments for method 3000, the video unit is a B slice or B picture, and wherein a prediction direction of the uni-prediction motion candidate is set to list 0 (L0) or list 1 (L1). In some embodiments for method 3000, a motion vector of the uni-prediction motion candidate is set to (0, 0). In some embodiments for method 3000, a motion vector of the uni-prediction motion candidate is set to (−m×W, 0), wherein m and W are integers. In some embodiments for method 3000, a motion vector of the uni-prediction motion candidate is set to (0, −q×H), wherein q and H are integers. In some embodiments for method 3000, a motion vector of the uni-prediction motion candidate is set to (−m×W, −q×H), wherein m, q, H and W are integers.

In some embodiments for method 3000, W is an allowed width for a prediction unit (PU), a coding unit (CU), or a transform unit (TU) of a video block of the video unit. In some embodiments for method 3000, H is an allowed height for a prediction unit (PU), a coding unit (CU), or a transform unit (TU) of a video block of the video unit. In some embodiments for method 3000, a reference index of the uni-prediction motion candidate is set to a value less than a number of reference pictures in a prediction direction. In some embodiments for method 3000, the prediction direction of the uni-prediction motion candidate is set to list 0 (L0) or list 1 (L1). In some embodiments for method 3000, a reference picture is set to a current picture associated with the video unit. In some embodiments for method 3000, a syntax element that indicates that an intra block copy (IBC) mode is enabled for a video block of the video unit is set to 1.

In some embodiments for method 3000, at least one of the K HMVP motion candidates is a bi-prediction motion candidate. In some embodiments for method 3000, the video unit is a P slice or picture, and wherein each prediction direction of the bi-prediction motion candidate is set to list 0 (L0). In some embodiments for method 3000, the video unit is a B slice or B picture, and wherein at least one prediction direction of the bi-prediction motion candidate is set to list 0 (L0) or list 1 (L1). In some embodiments for method 3000, a motion vector of the bi-prediction motion candidate is set to (0, 0). In some embodiments for method 3000, a motion vector of the bi-prediction motion candidate is set to (−m×W, 0), wherein m and W are integers.

In some embodiments for method 3000, a motion vector of the bi-prediction motion candidate is set to (0, −q×H), wherein q and H are integers. In some embodiments for method 3000, a motion vector of the bi-prediction motion candidate is set to (−m×W, −q×H), wherein m, q, H and W are integers. In some embodiments for method 3000, W is an allowed width for a prediction unit (PU), a coding unit (CU), or a transform unit (TU) associated with a video block of the video unit. In some embodiments for method 3000, H is an allowed height for a prediction unit (PU), a coding unit (CU), or a transform unit (TU) associated with a video block of the video unit. In some embodiments for method 3000, a reference index of the bi-prediction motion candidate is set to a value less than a number of reference pictures in at least one prediction direction. In some embodiments for method 3000, the at least one prediction direction of the bi-prediction motion candidate is set to list 0 (L0) or list 1 (L1).

In some embodiments for method 3000, identical weighting factors are used for two motion vectors associated with the bi-prediction motion candidate. In some embodiments for method 3000, a Generalized Bi-Prediction (GBi) index for the video unit is set to 0. In some embodiments for method 3000, at least one of the K HMVP motion candidates comprises motion information from a second video unit different from the video unit. In some embodiments for method 3000, the video unit comprises a first coding tree unit (CTU) row or a first picture, and wherein the second video unit comprises a second CTU or a second picture.

In some embodiments for method 3000, for a plurality of P slices or a plurality of P pictures, at least one of the K HMVP motion candidates comprises a motion vector set to (Mv(0,0), i), where i is a reference picture index which is in the range in between 0 and a number of reference pictures in list 0 minus 1, inclusive, and the video unit is a P slice from the plurality of P slices or the video unit is a P picture from the plurality of P pictures. In some embodiments for method 3000, the K HMVP motion candidates are added to the HMVP table in an ascending order up to i. In some embodiments for method 3000, the K HMVP motion candidates are added to the HMVP table in a descending order starting from i. In some embodiments for method 3000, one or more HMVP motion candidates are repeatedly added to the HMVP table until the HMVP table includes K candidates in response to a number of reference picture in list 0 (L0) being less than K.

In some embodiments for method 3000, the one or more available HMVP motion candidates are repeatedly added to the HMVP table until the HMVP table includes K candidates in response to a number of reference picture in list 0 (L0) being less than K. In some embodiments for method 3000, for a plurality of B slices or a plurality of B pictures, the K HMVP motion candidate includes: K0 uni-prediction motion candidates from list X, K1 uni-prediction motion candidates from list Y where Y is equal to (1−X)), and K2 bi-prediction motion candidates where K0+K1+K2=K, and K0/K1/K2>=0, and where the video unit is a B slice from the plurality of B slices or the video unit is a B picture from the plurality of B pictures.

In some embodiments for method 3000, for a plurality of B slices or a plurality of B pictures, the K HMVP motion candidate includes only bi-prediction motion candidates, and where the video unit is a B slice from the plurality of B slices or the video unit is a B picture from the plurality of B pictures. In some embodiments for method 3000, for a plurality of B slices or a plurality of B pictures, the K HMVP motion candidate includes uni-prediction motion candidates interleaved with bi-prediction motion candidates, and where the video unit is a B slice from the plurality of B slices or the video unit is a B picture from the plurality of B pictures. In some embodiments for method 3000, for a plurality of B slices or a plurality of B pictures, the K HMVP motion candidate includes uni-prediction motion candidates followed by bi-prediction motion candidates, and where the video unit is a B slice from the plurality of B slices or the video unit is a B picture from the plurality of B pictures.

In some embodiments for method 3000, the counter of available HMVP motion candidates in the HMVP table is excluded from the bitstream representation in response to K being equal to N. In some embodiments for method 3000, at least one HMVP motion candidate from the K HMVP motion candidates refers to a reference picture with a reference index equal to a specific value. In some embodiments for method 3000, the specific value is zero. In some embodiments for method 3000, the K HMVP motion candidates for the video unit is adaptively changed to obtain a second set of K HMVP motion candidates for a second video unit of the video, where the second video unit is different from the video unit.

Figure 31:
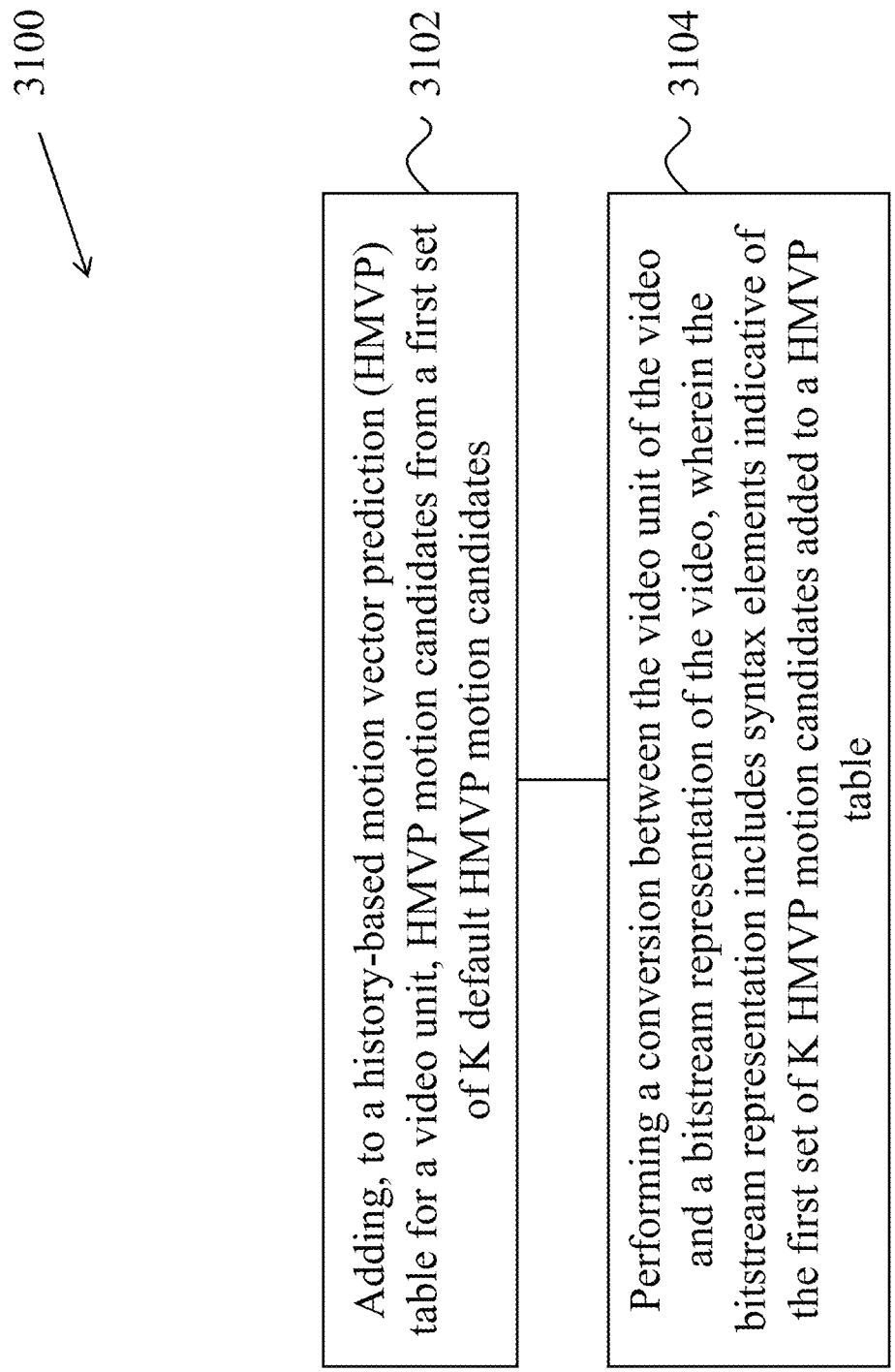

FIG. 31 is a flowchart for an example method 3100 for video processing. The method 3100 includes adding 3102, to a history-based motion vector prediction (HMVP) table for a video unit, HMVP motion candidates from a first set of K default HMVP motion candidates, wherein the first set of K HMVP motion candidates for the video unit is adaptively changed from a second set of K HMVP motion candidates included in the HMVP table for a second video unit of the video, wherein the second video unit is different from the video unit, wherein the first set of K HMVP motion candidates and the second set of K HMVP motion candidates have default values, wherein the HMVP table has a size of N, wherein N and K are positive integers, and wherein K≤N; and performing 3104 a conversion between the video unit of the video and a bitstream representation of the video, wherein the bitstream representation includes syntax elements indicative of the first set of K HMVP motion candidates added to a HMVP table.

In some embodiments for method(s) 3000 and/or 3100, the video unit comprises a first coding tree unit (CTU) row, and wherein the second video unit comprises a second CTU row. In some embodiments for method(s) 3000 and/or 3100, the video unit comprises a first tile, and wherein the second video unit comprises a second tile.

In some embodiments for method 3000, the K HMVP motion candidates used for the HMVP table is different than that used for another HMVP table. In some embodiments for method 3000, a selection of the K HMVP motion candidates is based on the HMVP table used for a coding mode associated with a video block of the video unit. In some embodiments for method 3000, the K HMVP motion candidates used for a video block coded using an inter-coding mode is different than that used for the video block coded using an intra block copy (IBC) mode, and the video block belongs to the video unit. In some embodiments for method 3000, the method further comprises determining, prior to the performing the conversion, that N HMVP motion candidates have been filled in the HMVP table; and adding, based on the determining, another motion candidate to the HMVP table according to a rule. In some embodiments for method 3000, the rule specifies that the another motion candidate is added to the HMVP table by performing a comparing operation in which the another motion candidate is compared to each candidate in the HMVP table in an ascending order or a descending order of indexes of the N HMVP motion candidates. In some embodiments for method 3000, the performing the comparing operation is terminated when the another motion candidate matches a motion candidate in the HMVP table. In some embodiments for method 3000, the performing the comparing operation includes upon determining that the another motion candidate is identical to a motion candidate in the HMVP table: removing the motion candidate from the HMVP table, and adding the another motion candidate to a last entry in the HMVP table.

In some embodiments for method 3000, the performing the comparing operation is terminated after determining, for all of the K HMVP motion candidates in the HMVP table, whether the another motion candidate matches any motion candidate in the HMVP table. In some embodiments for method 3000, the performing the comparing operation includes upon determining that the another motion candidate is identical to all M motion candidates in the HMVP table: removing the M motion candidates from the HMVP table, and repeatedly adding the another motion candidate to the HMVP table until the HMVP table is full. In some embodiments for method(s) 3000 and/or 3100, the K HMVP motion candidates added to the HMVP table are signaled in a video parameter set (VPS), a decoder parameter set (DPS), a sequence parameter set (SPS), an adaptation parameter set (APS), a picture parameter set (PPS), a picture header, a slice header or a tile group header. In some embodiments for method(s) 3000 and/or 3100, multiple sets of K HMVP motion candidates are predefined, and the bitstream representation includes an index of the K HMVP motion candidates within the multiple sets of default K HMVP motion candidates for the video unit.

In some embodiments for method(s) 3000 and/or 3100, multiple sets of K HMVP motion candidates are predefined, the bitstream representation includes an index of a coding mode for a video block of the video unit, and the index of the coding mode indicates that the K HMVP motion candidates within the multiple sets of default K HMVP motion candidates is to be used for the video unit. In some embodiments for method(s) 3000 and/or 3100, the video unit comprises a picture, a slice, a tile group, a tile, a coding tree unit (CTU) row.

In some embodiments for method 3000, the HMVP table is updated by: adding an additional HMVP motion candidate to the HMVP table before all of existing HMVP motion candidates in the HMVP table. In some embodiments for method 3000, an entry index of the HMVP table having a smallest value indicates a latest HMVP motion candidate in the HMVP table, and the additional HMVP motion candidate is added before the latest HMVP motion candidate added to the HMVP table. In some embodiments for method 3000, the method further comprises determining that an additional HMVP motion candidate is not to be added to the HMVP table upon determining that the additional HMVP motion candidate is identical or similar to at least one HMVP motion candidate in the HMVP table.

In some embodiments for method 3000, the at least one HMVP motion candidate is removed from the HMVP table upon determining that the additional HMVP motion candidate is identical or similar to the at least one HMVP motion candidate in the HMVP table. In some embodiments for method 3000, the additional HMVP motion candidate is determined to be identical or similar to the at least one HMVP motion candidate by determining that a difference between motion vectors corresponding to the additional HMVP motion candidate and the at least one HMVP motion candidate is less than a threshold.

In some embodiments for method(s) 3000 and/or 3100, a video block of the video unit is coded using an inter coded mode or an intra block copy (IBC) mode. In some embodiments for method(s) 3000 and/or 3100, the K HMVP motion candidates for the HMVP table is selected from multiple sets of K HMVP motion candidates, and the K HMVP motion candidates for the HMVP table is selected based on a coding mode of a video block of the video unit. In some embodiments for method(s) 3000 and/or 3100, the coding mode includes an inter coded mode or an intra block copy (IBC) mode. In some embodiments for method(s) 3000 and/or 3100, the default values further include default values for an intra prediction mode. In some embodiments for method 3000, the resetting further comprising marking existing entries in the HMVP table as unavailable or deleting the existing entries prior to the adding the K HMVP motion candidates. In some embodiments for method(s) 3000 and/or 3100, the performing of the conversion includes an encoding operation in which the bitstream representation is generated from a video block of the video unit. In some embodiments for method(s) 3000 and/or 3100, the performing of the conversion includes a decoding operation in which a video block of the video unit is generated from the bitstream representation.

From the foregoing, it will be appreciated that specific embodiments of the present disclosure have been described herein for purposes of illustration, but that various modifications may be made without deviating from the scope of the invention. Accordingly, the presently disclosed embodiments are not limited except as by the appended claims.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
resetting, for a conversion between a video unit of a video and a bitstream of the video, a history-based motion vector prediction (HMVP) table of size N by adding K HMVP motion candidates to the HMVP table,
wherein the K HMVP motion candidates have default values,
wherein N and K are positive integers, and
wherein K≤N; and
performing the conversion between the video unit and the bitstream using the HMVP table resulting from the resetting,
wherein, for a plurality of P slices or a plurality of P pictures, at least one of the K HMVP motion candidates comprises a motion vector set to (Mv(0,0), i),
wherein i is a reference picture index which is in a range between 0 and a number of reference pictures in list 0 minus 1, inclusive,
wherein the video unit is a P slice from the plurality of P slices or the video unit is a P picture from the plurality of P pictures, and
wherein a counter of available HMVP motion candidates in the HMVP table is excluded from the bitstream of the video in response to K being equal to N.

2. The method of claim 1, wherein the K HMVP motion candidates are added to the HMVP table in an ascending order up to i, or wherein the K HMVP motion candidates are added to the HMVP table in a descending order starting from i.

3. The method of claim 1, wherein one or more HMVP motion candidates are added to the HMVP table until the HMVP table includes K candidates in response to a number of reference picture in list 0 (L0) being less than K.

4. The method of claim 3, wherein, for a plurality of B slices or a plurality of B pictures:
a) the K HMVP motion candidate includes: K0 uni-prediction motion candidates from list X, K1 uni-prediction motion candidates from list Y where Y is equal to (1−X)), and K2 bi-prediction motion candidates where K0+K1+K2=K, and K0/K1/K2>=0, wherein the video unit is a B slice from the plurality of B slices or the video unit is a B picture from the plurality of B pictures; or
b) the K HMVP motion candidate includes only bi-prediction motion candidates, wherein the video unit is a B slice from the plurality of B slices or the video unit is a B picture from the plurality of B pictures; or
c) the K HMVP motion candidate includes uni-prediction motion candidates interleaved with bi-prediction motion candidates, wherein the video unit is a B slice from the plurality of B slices or the video unit is a B picture from the plurality of B pictures; or
d) the K HMVP motion candidate includes uni-prediction motion candidates followed by bi-prediction motion candidates, wherein the video unit is a B slice from the plurality of B slices or the video unit is a B picture from the plurality of B pictures.

5. The method of claim 1, wherein at least one HMVP motion candidate from the K HMVP motion candidates refers to a reference picture with a reference index equal to a specific value.

6. The method of claim 5, wherein the specific value is zero.

7. The method of claim 1, further comprising:
determining, prior to the performing the conversion, that N HMVP motion candidates have been filled in the HMVP table; and
adding, based on the determining, another motion candidate to the HMVP table according to a rule.

8. The method of claim 7, wherein the rule specifies that the another motion candidate is added to the HMVP table by performing a comparing operation in which the another motion candidate is compared to each candidate in the HMVP table in an ascending order or a descending order of indexes of the N HMVP motion candidates.

9. The method of claim 8, wherein the performing the comparing operation is terminated when the another motion candidate matches a motion candidate in the HMVP table.

10. The method of claim 8, wherein the performing the comparing operation includes, upon determining that the another motion candidate is identical to a motion candidate in the HMVP table:
removing the motion candidate from the HMVP table; and
adding the another motion candidate to a last entry in the HMVP table.

11. The method of claim 8, wherein the performing the comparing operation is terminated after determining, for all of the K HMVP motion candidates in the HMVP table, whether the another motion candidate matches any motion candidate in the HMVP table.

12. The method of claim 11, wherein the performing the comparing operation includes, upon determining that the another motion candidate is identical to all M motion candidates in the HMVP table:
removing the M motion candidates from the HMVP table; and
repeatedly adding the another motion candidate to the HMVP table until the HMVP table is full.

13. The method of claim 1, further comprising:
determining that an additional HMVP motion candidate is not to be added to the HMVP table upon determining that the additional HMVP motion candidate is identical or similar to at least one HMVP motion candidate in the HMVP table.

14. The method of claim 13, wherein the at least one HMVP motion candidate is removed from the HMVP table upon determining that the additional HMVP motion candidate is identical or similar to the at least one HMVP motion candidate in the HMVP table.

15. The method of claim 1, wherein the conversion includes encoding the video unit into the bitstream.

16. The method of claim 1, wherein the conversion includes decoding the video unit from the bitstream.

17. An apparatus for processing video data comprising a processor and a non-transitory memory with instructions thereon, wherein the instructions upon execution by the processor, cause the processor to:
reset, for a conversion between a video unit of a video and a bitstream of the video, a history-based motion vector prediction (HMVP) table of size N by adding K HMVP motion candidates to the HMVP table, wherein the K HMVP motion candidates have default values,
wherein N and K are positive integers, and
wherein K≤N; and
perform the conversion between the video unit and the bitstream using the HMVP table resulting from the resetting,
wherein, for a plurality of P slices or a plurality of P pictures, at least one of the K HMVP motion candidates comprises a motion vector set to (Mv(0,0), i),
wherein i is a reference picture index which is in a range between 0 and a number of reference pictures in list 0 minus 1, inclusive,
wherein the video unit is a P slice from the plurality of P slices or the video unit is a P picture from the plurality of P pictures, and
wherein a counter of available HMVP motion candidates in the HMVP table is excluded from the bitstream of the video in response to K being equal to N.

18. A non-transitory computer-readable recording medium storing a bitstream of a video which is generated by a method performed by a video processing apparatus, wherein the method comprises:
resetting a history-based motion vector prediction (HMVP) table of size N by adding K HMVP motion candidates to the HMVP table,
wherein the K HMVP motion candidates have default values,
wherein N and K are positive integers, and
wherein K≤N; and
generating the bitstream using the HMVP table resulting from the resetting,
wherein, for a plurality of P slices or a plurality of P pictures, at least one of the K HMVP motion candidates comprises a motion vector set to (Mv(0,0), i),
wherein i is a reference picture index which is in a range between 0 and a number of reference pictures in list 0 minus 1, inclusive,
wherein the video unit is a P slice from the plurality of P slices or the video unit is a P picture from the plurality of P pictures, and
wherein a counter of available HMVP motion candidates in the HMVP table is excluded from the bitstream of the video in response to K being equal to N.

19. The apparatus of claim 17, wherein the K HMVP motion candidates are added to the HMVP table in an ascending order up to i, or wherein the K HMVP motion candidates are added to the HMVP table in a descending order starting from i.

20. The apparatus of claim 17, wherein one or more HMVP motion candidates are added to the HMVP table until the HMVP table includes K candidates in response to a number of reference picture in list 0 (L0) being less than K.

* * * * *